United States Patent [19]

Iwasaki

[11] Patent Number: 5,450,163
[45] Date of Patent: Sep. 12, 1995

[54] PHOTOMETRIC DEVICE FOR CAMERA

[75] Inventor: Hiroyuki Iwasaki, Kawasaki, Japan

[73] Assignee: Nikon Corporation, Tokyo, Japan

[21] Appl. No.: 122,291

[22] Filed: Sep. 17, 1993

[30] Foreign Application Priority Data

Sep. 25, 1992 [JP] Japan .................. 4-256967
Oct. 14, 1992 [JP] Japan .................. 4-275618
Jun. 1, 1993 [JP] Japan .................. 5-130789

[51] Int. Cl.6 .............................. G03B 7/08
[52] U.S. Cl. .............................. 354/432
[58] Field of Search ........................ 354/432

[56] References Cited

U.S. PATENT DOCUMENTS

| | | | |
|---|---|---|---|
| 4,214,826 | 7/1980 | Uchida et al. | 354/432 |
| 4,364,650 | 12/1982 | Terashita et al. | 354/432 |
| 4,429,969 | 2/1984 | Saegusa | 354/432 |
| 4,443,080 | 4/1984 | Saegusa | 354/432 |
| 4,445,778 | 5/1984 | Nakauchi | 354/432 |
| 4,476,383 | 10/1984 | Fukuhara et al. | 354/432 |
| 4,527,881 | 7/1985 | Sugawara | 354/432 |
| 4,561,752 | 12/1985 | Miyazaki et al. | 354/432 |
| 4,791,446 | 12/1988 | Ishida et al. | |
| 4,843,417 | 6/1989 | Ishida et al. | |
| 4,929,824 | 5/1990 | Miyazaki | |
| 4,969,005 | 11/1990 | Tokunaga | 354/432 |
| 5,184,172 | 2/1993 | Miyazaki | 354/432 |
| 5,249,015 | 9/1993 | Takagi et al. | 354/432 |

FOREIGN PATENT DOCUMENTS 62-259022 11/1987 Japan .
1-217428 8/1989 Japan .

*Primary Examiner*—Russell E. Adams
*Attorney, Agent, or Firm*—Oliff & Berridge

[57] ABSTRACT

The photometric device for a camera according to this invention enables calculation of an exposure value without carrying out a photometry again even when in at least a part of plural photometric regions exists a region whose brightness information is small. According to the photometric device which is equipped with a photometric unit for carrying out a photometry on a subject field which is divided into plural photometric regions to detect brightness information of each photometric region, thereby calculating the exposure value on the basis of the plural brightness information from the photometric unit, one of a first calculation mode in which the exposure value is calculated on the basis of the brightness information of each photometric region and a second calculation mode in which an average value of plural brightness information of the plural photometric regions is calculated and the exposure value is calculated on the basis of the average value is selected on the basis of the brightness information, and the exposure calculation value is calculated in accordance with the selected calculation mode.

25 Claims, 27 Drawing Sheets

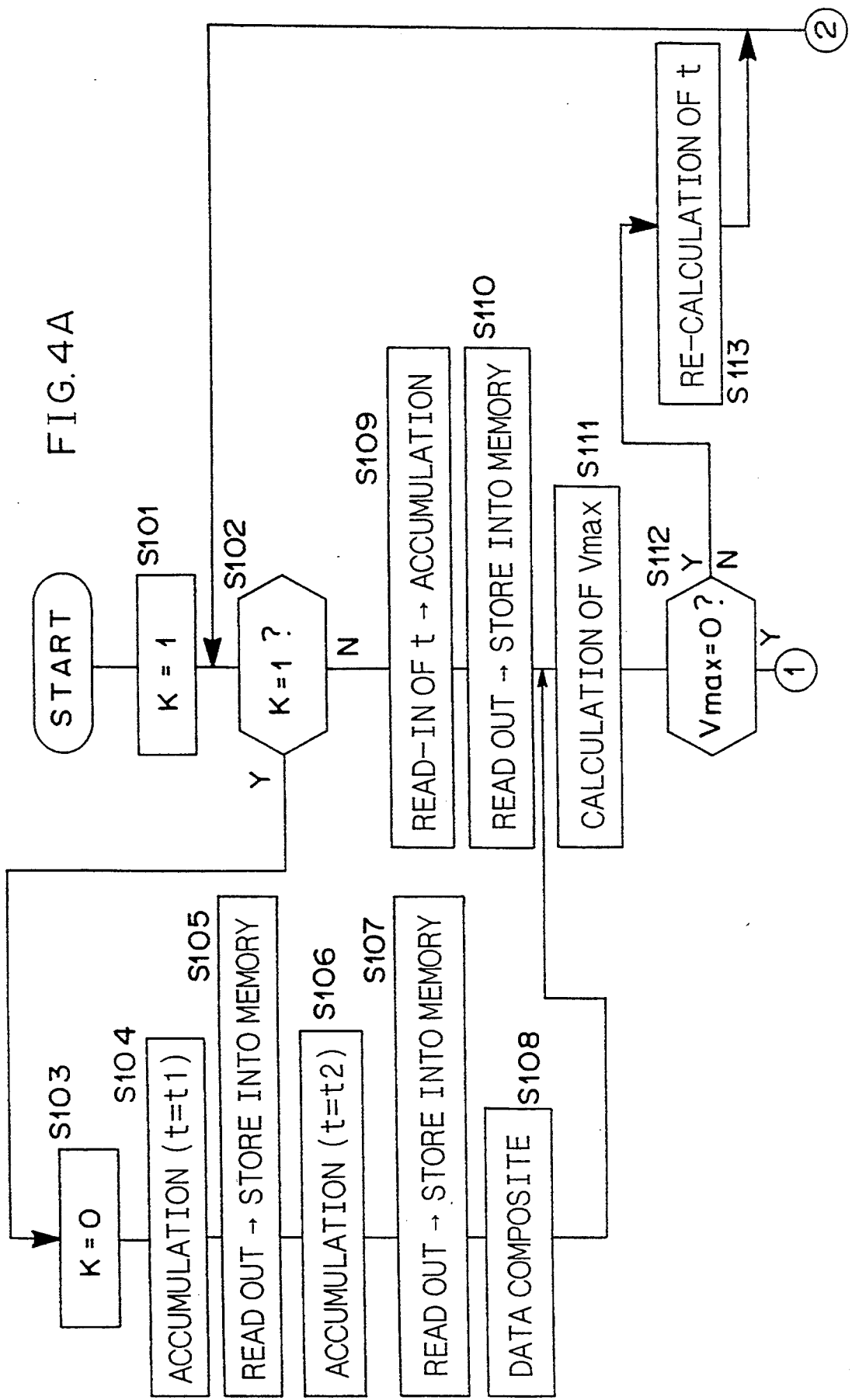

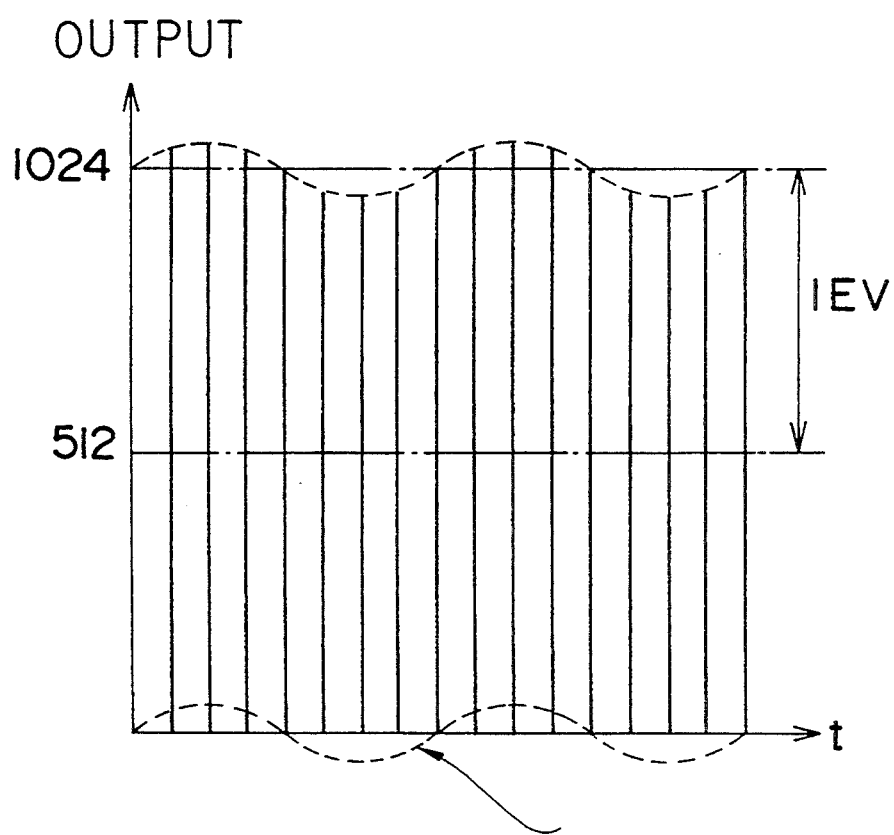

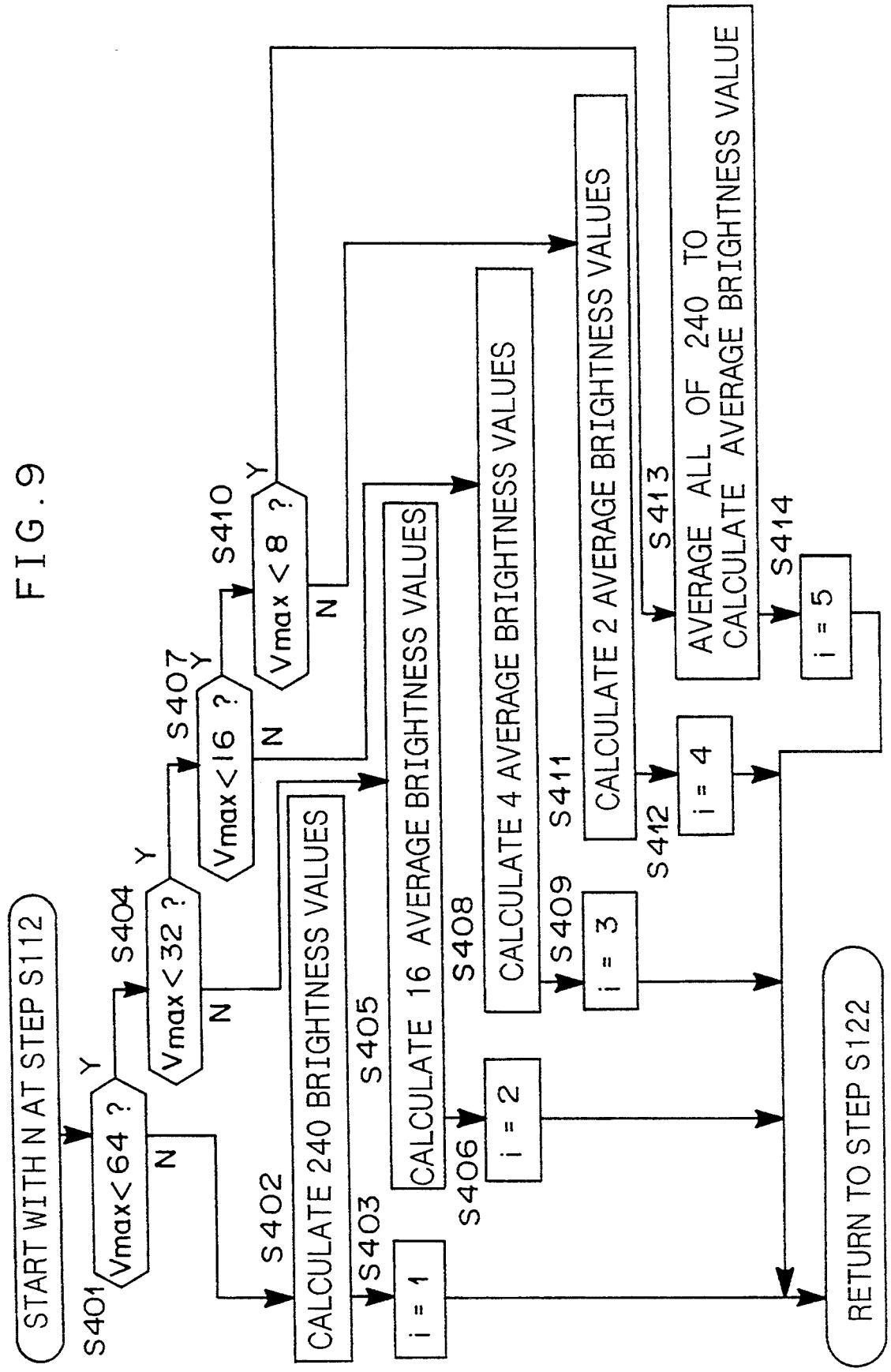

Fig. 15

| 16 | 17 | 18 | 19 | 20 |
|----|----|----|----|----|
| 11 | 12 | 13 | 14 | 15 |
| 6  | 7  | 8  | 9  | 10 |
| 1  | 2  | 3  | 4  | 5  |

PHOTOMETRIC DEVICE FOR CAMERA

BACKGROUND OF THE INVENTION

1. Field of the Invention

This invention relates to a photometric device for a camera in which a photometry is conducted on a subject field which is divided into plural photometric regions, thereby calculating an exposure value on the basis of information on brightness of each photometric region.

2. Description of Related Art

There has been conventionally known a camera for performing photometry on a subject field to be photographed which is divided into plural photometric regions to calculate an exposure value on the basis of information on brightness of each photometric region. For example, a camera as disclosed in Japanese laid-open Patent Application No. 1-217428 adopts a so-called "divisional photometry" in which a photographic field (corresponding to a subject field) is sectioned in a matrix form into plural photometric regions. Each of the photometric regions is independently subjected to a photometry to detect information on brightness of each photometric region, that is, a photometric signal (photometric output value) corresponding to each photometric region and obtain a proper exposure value.

A photometric device for the divisional photometry has been known that uses an electric charge accumulation-type of photoelectric conversion device, such as a Charge Coupled Device (CCD) as disclosed in Japanese laid-open Patent Application No. 62-259022, for example. In general, such an electric charge accumulation-type of photoelectric conversion device outputs plural photometric signals, each corresponding to each photometric region, one by one in time series.

Noise components are necessarily contained in the plural photometric signals which are output from the photometric device as described above, and it is believed that these noise components would occur due to the dark current of the photometric device and noises occurring in a photometric circuit. The intensity of the noise components is dependent on temperature of the photometric device, the voltage of a power source, etc., and it is not dependent on the brightness of a subject (in the field). Therefore, for a subject which is brighter than a certain degree (i.e., for a large photometric signal), no problem occurs because the noise component is negligibly small as compared to the photometric signal. On the other hand, when a subject darkens (i.e., a photometric signal becomes small), the percentage of the noise component in the photometric signal is increased, and thus an error in performing photometry is also increased.

Accordingly, when photometric signals are smaller than a predetermined value, the photometric signals in a region are required to be removed from or invalidated for photometric data prior to the calculation of the exposure value, because a photometric error for the region is judged to be large. When such a removal or invalidating operation of the noise-containing photometric signals is carried out, photometric signals for subjects of low brightness in a photographic field can not be obtained. In an extreme case, no effective data is obtained when all of plural photometric signals are smaller than the predetermined value, and thus the photometry must be carried out again to calculate an exposure value. However, such a repetitive photometry causes a time for a photographic operation to be longer, so that the camera loses its high-speed photographing performance. This is unfavorable particularly for a case where a continuous shooting mode for film advance is set in the camera.

Further, when the electric charge accumulation-type of photoelectric conversion element is used as the photometric element, a photometric signal may be small in a case where a time is insufficient for accumulating charge even when a subject has a high brightness, and in this case the above problem is liable to occur.

SUMMARY OF THE INVENTION

An object of this invention is to provide a photometric device for a camera in which an exposure value can be calculated without repeatedly carrying out a photometry (i.e., without re-photometry) even when a region having information on low brightness exists at least in a part of plural photometric regions.

In order to attain the above object, the photometric device according to one aspect of this invention which is equipped with photometric means for carrying out a photometry for a subject field which is divided into plural photometric regions to detect information on brightness of each photometric region, thereby calculating an exposure value on the basis of the brightness information of the plural photometric regions output by the photometric means, comprises judging means for judging, on the basis of said brightness information, whether an object in the subject field has a low brightness (i.e., below a predetermined level), selection means for selecting a first calculation mode for calculating the exposure value on the basis of the brightness information of each photometric region when the judging means determines that the object does not have a low brightness, and a second calculation mode for calculating an average value of plural brightness information of the plural photometric regions and calculating the exposure value on the basis of the average value thus calculated when the judging means determines that the object has a low brightness, and exposure calculation means for calculating the exposure value in accordance with the selected calculation mode.

The photometric device according to another aspect of this invention which is equipped with photometric means for carrying out a photometry for a subject field which is divided into plural photometric regions to detect information on brightness of each photometric region, thereby calculating an exposure value on the basis of the brightness information of the plural photometric regions output by the photometric means, comprises judging means for judging, on the basis of the brightness information, whether an object in the subject field has a low brightness, selection means for selecting a first calculation mode for calculating the exposure value on the basis of the brightness information of each photometric region when the judging means determines that the object does not have a low brightness, and a second calculation mode for dividing the plural photometric regions into plural groups, calculating an average value of brightness information of the photometric regions in at least one of the groups and calculating the exposure value on the basis of the average value thus calculated when the judging means determines that the object has a low brightness, and exposure calculation means for calculating the exposure value in accordance with the selected calculation mode.

The photometric device according to another aspect of this invention which is equipped with photometric means for carrying out a photometry for a subject field which is divided into plural photometric regions to detect information on brightness of each photometric region, thereby calculating an exposure value on the basis of the brightness information of the plural photometric regions output by the photometric means, comprises first judging means for judging, on the basis of the brightness information, whether each of the plural photometric regions has a low brightness, grouping means for grouping at least two photometric regions of the plural photometric regions into one group the at least two photometric regions being judged by the first judging means to have a low brightness, group signal calculation means for calculating information representing a brightness of the one group from the brightness information of the photometric regions grouped by the grouping means, into the one group and exposure calculation means for calculating the exposure value on the basis of the brightness information of each photometric region and the information representing the brightness of the one group.

FIGS. 7, 8A and 8B simulatively show information on brightness which is output from the photometric means, that is, these figures show time charts for photometric output values (photometric signals). In the examples as shown in FIGS. 7, 8A and 8B, the photometric output value of each photometric region is output in time series every region.

In FIG. 7, it is assumed that a subject having the same brightness exists in each photometric region and a (waveshaped) noise component as indicated by a dotted line is contained in the photometric signals. This noise component occurs in a photometric circuit or the like, and it has some periodicity or has a substantially zero average value even if it has no periodicity. Due to the periodicity of the noise component as described above, all of photometric signals which are obtained from the photometric means do not have the same amount of noise component, but have a different amount of noise component which corresponds to the time period of the noise component. However, in a case where the subject is bright as shown in FIG. 7, the percentage of the noise component in the photometric output is small, so that no problem occurs in calculation of the brightness value.

Further, in an APEX (Additive System of Photographic Exposure) which is frequently used for a camera, the brightness value is represented by logarithm having its base at 2. For example, providing that a photometric signal represents "1024", a photometric signal of a subject of which the brightness value is lower by 1 EV than the brightness value which corresponds to the photometric signal of "1024" is represented as "512". Accordingly, even when a photometric signal itself is varied from "512" to "1024", the brightness value of the photometric signal is varied merely by 1 EV. Therefore, the noise fluctuation as shown in FIG. 7 becomes non-problematic when the photometric signal is converted to the corresponding brightness value.

FIGS. 8A and 8B show a case where a subject having the same brightness exists in each photometric region similarly in the case of FIG. 7, but the subject has low brightness. Regardless of the brightness of the subject, the intensity for the noise component is unvaried as compared with the one in the case of FIG. 7 because the intensity of the noise component is dependent on the photometric circuit or the like. This situation is shown in FIG. 8A. As described above, as the percentage of the noise component in photometric signal is increased, the photometric signals are more fluctuated due to the effects of the noise component even for the brightness component which is identical between the respective photometric signals, and thus a photometric error is induced.

Furthermore, like the case of FIG. 7, the brightness value is represented by a logarithm value, and as shown in FIG. 8A 1 EV gap in brightness value exists between photometric signals of "8" and "4". In this case, 1 EV gap occurs in brightness value for increase of "512" between the two photometric signals ("512" and "1024") in the case of FIG. 7, whereas 1 EV gap occurs in brightness value for increase of "4" between the two photometric signals ("4" and "8") in FIGS. 8A and 8B. Therefore, a large amount of error would occur in this case (FIG. 8A) even when only the noise component is converted to the brightness value. This causes reliability to the photometric device to be lost.

Conventionally, "photometry impossible" has been declared when the photometric output is small to such an extent that the noise component is not negligible. If the average value of the noise component is calculated, the average value would be offset by the periodicity or the like of the noise component and substantially equal to zero. Accordingly, by averaging the photometric signals, the noise component is offset as shown in FIG. 8B, and only the brightness value component can be taken out. Therefore, the brightness value can be also calculated from even photometric outputs having minute intensity to which "photometry impossible" has been conventionally set (declared), so that it is unnecessary to carry out the photometry again (re-photometry).

In this case, the photometric value itself is averaged, and thus the brightness value thereof also becomes an average brightness value thereof in every photometric region. Accordingly, the brightness value having little error can be obtained for a subject having low brightness for which the photometry has been conventionally impossible, with keeping the number of the photometric regions at a proper degree by the following method. In other words, when the photometric output values are large, the brightness value is calculated at every photometric region. On the other hand, when the photometric output values are small, the (averaged) brightness value is calculated on a group basis (at every group unit) through a grouping operation of photometric output values. Additionally, even in a case where all the photometric output values from the photometric regions must be averaged, the number of the photometric regions is equal to "1" as a result, but the brightness value having little error can be obtained.

As described above, according to this invention, even when regions having small photometric output are contained in photometric regions, the noise components thereof can be offset, and a substantially accurate brightness value can be obtained without repeating the photometry. Accordingly, a proper exposure value can be obtained without repeating the photometry, and the high-speed photographing performance can be maintained.

BRIEF DESCRIPTION OF THE DRAWINGS

FIGS. 4A and 4B are main flowcharts for an operation of the first embodiment;

FIG. 7 is a diagram showing noise components contained in photometric signals;

FIG. 9 is a main flowchart for an operation of a second embodiment;

FIG. 15 is a diagram showing a setting method of the photometric average region of the third embodiment;

DETAILED DESCRIPTION OF THE PREFERRED EMBODIMENTS

First Embodiment

A first embodiment according to this invention will be described with reference to FIGS. 1 to 6.

(1) Optical System

Figure 2:
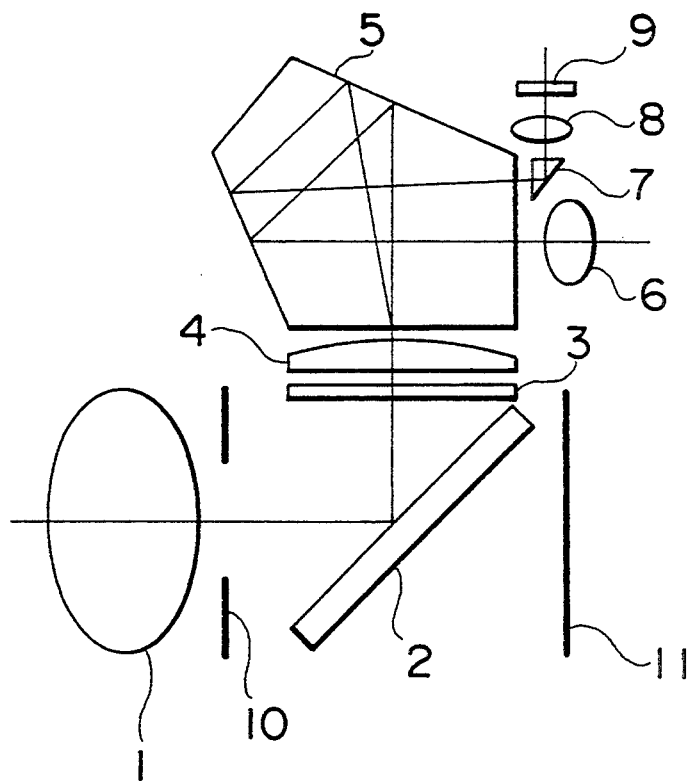
FIG. 2 is a diagram showing an optical system.

FIG. 2 shows the construction of an optical system of a camera. Light of a subject in a photography (hereinafter referred to as "subject light") which has been passed through a photographing lens 1 is directed through a quick return mirror 2, a diffusion screen 3, a condenser lens 4 and a pentagonal prism 5, and guided through an eyepiece 6 to an eye of a photographer. On the other hand, a part of the subject light which is diffused by the diffusion screen 3 is directed through the condenser lens 4, the pentagonal prism 5, a photometric prism 7 and a lens 8 to a photometric light-receiving device 9.

(2) Photometric Light-Receiving Device and Control System

Figure 1:
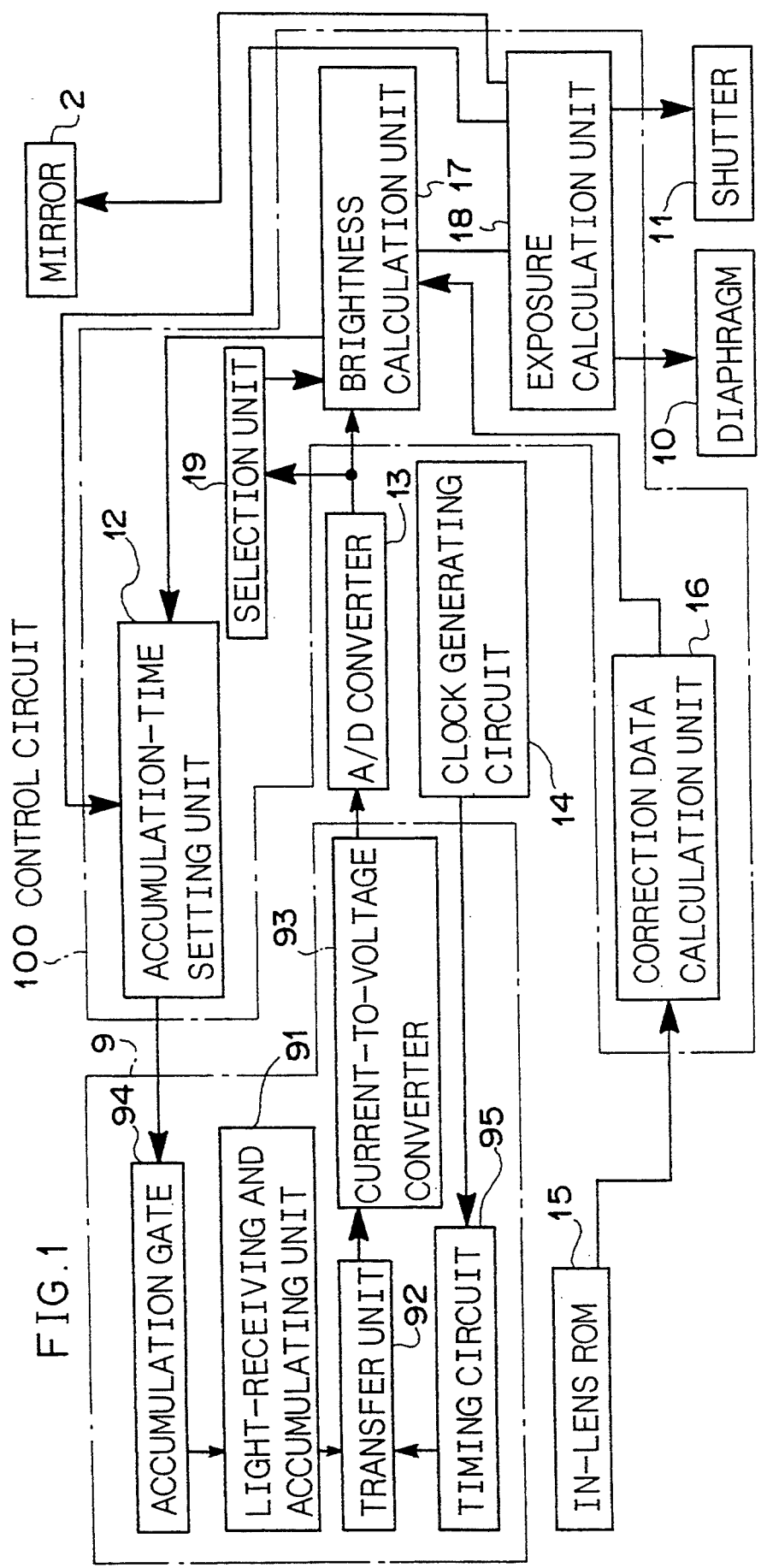
FIG. 1 is a block diagram showing a first embodiment of a brightness value calculating device according to this invention.
Figure 3:
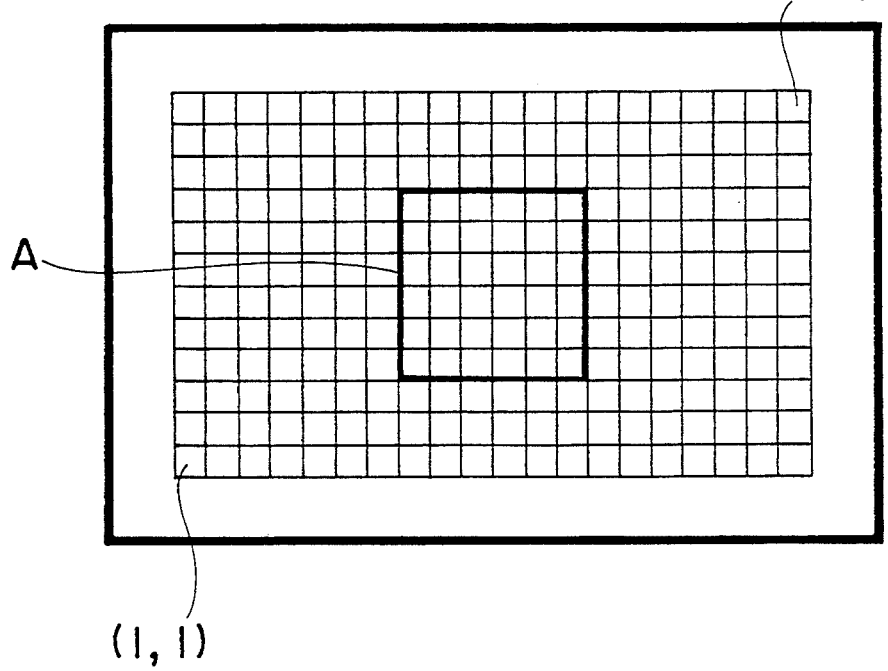
FIG. 3 is a diagram showing a divisional manner of a photometric region.

The photometric device 9 comprises an electric charge accumulation-type of photoelectric conversion device such as a CCD sensor, and as shown in FIG. 1 it includes a light-receiving and accumulating unit 91, a transfer unit 92, a current-to-voltage converter 93, an accumulation gate 94 and a timing circuit 95. As shown in FIG. 3, the light-receiving and accumulating unit 91 comprises totally 240 photoelectric segments (20 segments in a horizontal direction and 12 segments in a vertical direction) which are arranged in a matrix form so as to enable a photometry for a subject field, and charges which are induced in each segment upon light irradiation thereto are accumulated in each segment.

The timing circuit 95 serves to produce a clock pulse required for electric charge transfer in response to a master clock which is input from a clock generating circuit 14, and input the clock pulse to the transfer unit 92. In accordance with the input clock pulse, the transfer unit 92 picks up the electric charges accumulated in every segment (picture element) of the light-receiving and accumulating unit 91 in time series, and transfers the pickup charges to the current-to-voltage converter 93 in synchronism with each clock pulse. The current-to-voltage converter 93 serves to convert 240 charge signals input thereto into respective voltage values, and outputs them from an output terminal to an A/D (analog-to-digital) converter 13 as photometric signal. The A/D converter 13 converts the photometric signal (voltage signal) from the current-to-voltage converter 93 into a digital numerical signal (photometric output value) in order that a digital photometric operation in a control circuit 100 can be conducted, and outputs the converted digital signal. The accumulation gate 94 receives a pulse signal from an accumulation-time setting unit 12 in the control circuit 100, and instructs the light-receiving and accumulating unit 91 to start and terminate the electric charge accumulation.

The control circuit 100 actually comprises a microcomputer. The microcomputer functionally comprises the accumulation-time setting unit 12 as described above, a correction data calculating unit 16, a brightness calculating unit 17, an exposure calculating unit 18 and a selection unit 19. The accumulation-time setting unit 12 serves to calculate an optimum accumulation time for a next charge accumulating operation on the basis of information from the brightness value calculating unit 17 and the exposure calculating unit 18, thereby adjusting an accumulated charge amount. The details of the accumulation-time setting unit 12 will be described later.

The correction data calculating unit 16 serves to input lens information through an in-lens ROM 15 of the photographing lens which is mounted on the camera, and calculate a correction coefficient on the basis of the lens information. The selection unit 19 serves to select one of first and second calculation modes as described later on the basis of the photometric output from the A/D converter 13. The brightness value calculating unit 17 serves to calculate a brightness value in accordance with the calculation mode selected by the selection unit 19 using the correction coefficient of the correction data calculating unit 16, the accumulation time input from the accumulation-time setting unit 12 and the photometric output of the A/D converter 13.

The exposure calculating unit 18 receives a brightness signal from the brightness value calculating unit 17 to perform an exposure calculation for calculating a proper exposure value. Additionally, the exposure calculating unit 18 serves to calculate an aperture and a shutter speed based on the proper exposure.

Upon push-down of a release button (not shown), the mirror 2 is leapt up, and a diaphragm 10 and a shutter 11 are controlled to have calculated aperture and shutter speed to perform an exposure control operation.

The camera of this embodiment is equipped with two modes as a film advance mode, one being a continuous mode in which a release operation and a film wind-up operation are alternately carried out while the release button is fully pushed down to instruct the release operation, and the other being a single frame mode in which the film wind-up operation is carried out only by one frame upon full push-down of the release button. Any one of these film advance modes is selected by a photographer through a film advance mode switching means (not shown).

(3) Calculation Method of Brightness Value

Next, the first and second calculation modes will be described.

Figure 8A:
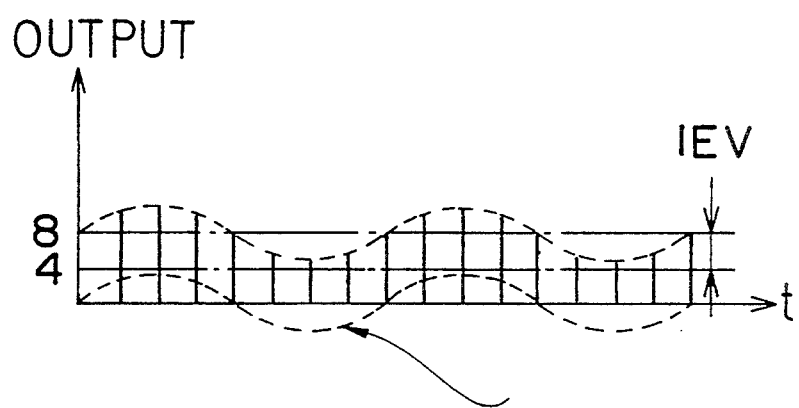
FIGS. 8A and 8B are diagrams showing the principle for offsetting of noise components contained in photometric signals.
Figure 8B:
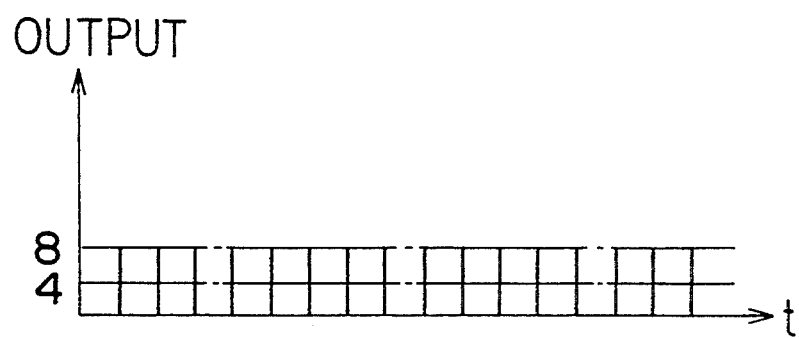

Since noises disturbing photometric output ordinarily occur with some periodicity on time axis as shown in FIG. 8A, each of photometric outputs which are taken out one by one in time series from the photometric device contains a noise component corresponding to the period of the noise. Therefore, the averaging of the plural photometric outputs enables the noise components to be offset as shown in FIG. 8B, and thus the true brightness value components can be taken out.

In this embodiment, in addition to the first calculation mode in which an individual brightness value for each photometric region is calculated from each photometric output, the second calculation mode in which the average value of plural photometric outputs is obtained and the brightness value is calculated on the basis of the average value is also provided. One of these calculation modes is selected in accordance with the photometric outputs. The details of this selection will be described later.

(4) Necessity of Accumulation Time Setting

Next, the necessity of adjustment of an accumulation time of the photometric light-receiving device 9 by the accumulation-time setting unit 12 will be described.

A range of EV0 to EV20, that is, about 20 EV in dynamic range is generally required as a photometric range for the photometric device of the camera, however, a currently-used CCD sensor has a dynamic range about 10 EV at maximum. Therefore, it is necessary to set the required photometric range to the optimum level containing a photometric value of a main subject by adjusting the accumulation time of the CCD sensor.

Specifically, when the brightness value in a subject field ranges from EV0 to EV20, illuminance on the light-receiving surface of the light-receiving device using a standard photographing lens is within a range of about 0.01 Lx to 10,000 Lx. The light-receiving device has the photosensitivity of about 20 V/lx.s and saturation output of about 2 V, and thus the photometric range is about EV10 to EV20 for the accumulation time of 10 μs, and about EV0 to EV10 for the accumulation time of 10 ms. That is, by adjusting the accumulation time of the light-receiving device in the range of 10 μs to 10 ms, the photometric range required for the photometric device of the camera, that is, the dynamic range of EV0 to EV20 can be first attained.

Incidentally, when the photometry is carried out using a CCD sensor, for the reason as described above, the photometric range in one photometry is limited to a range of 10 EV, however, no disadvantage in photography occurs because the dynamic range of a silver halide film is smaller than 10 EV.

(5) Main Algorithm

Figure 4B:
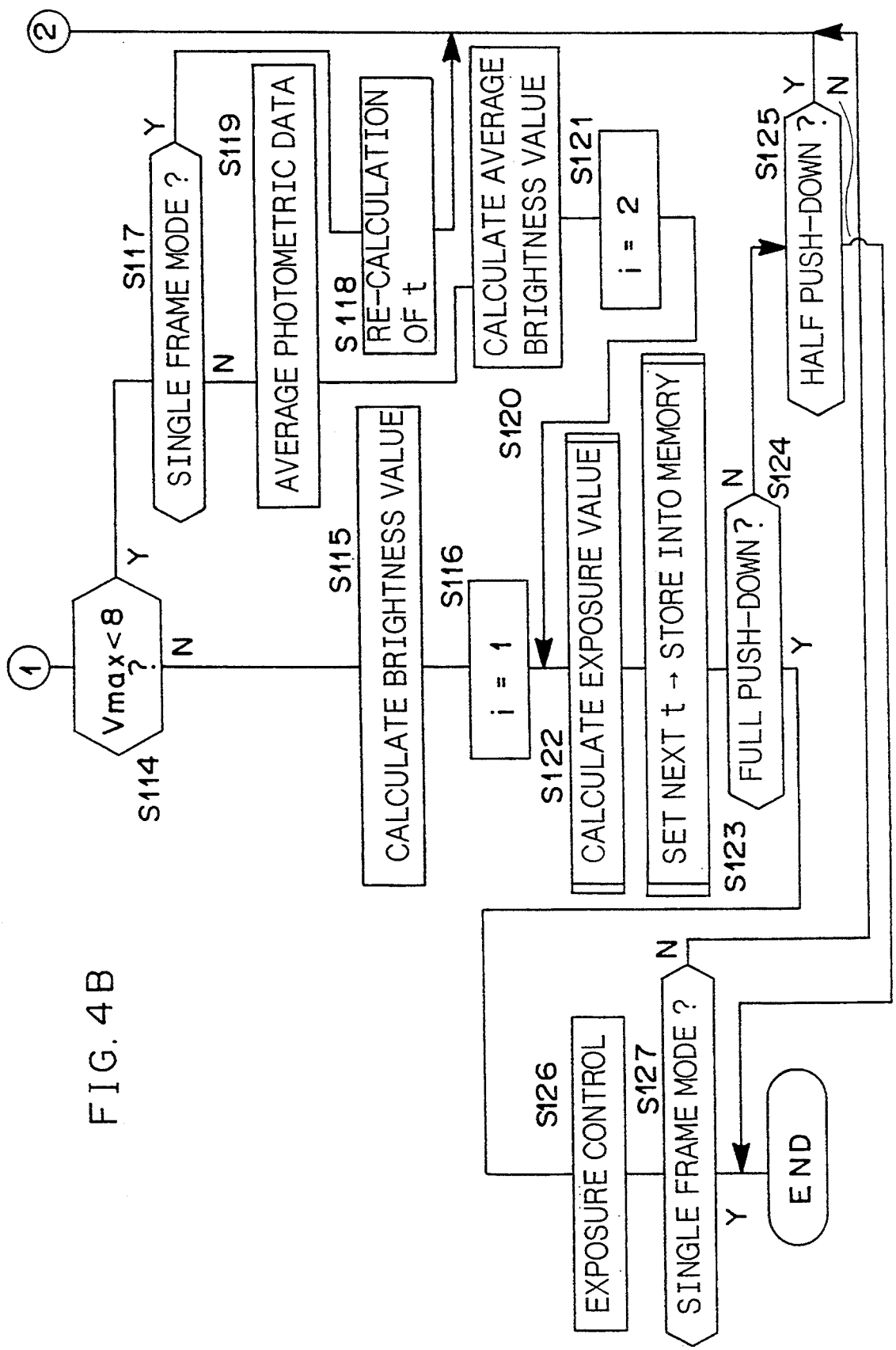

FIGS. 4A and 4B are flowcharts for a main algorithm of the control circuit 100.

When the release button is pushed down halfway (hereinafter referred to as "half push-down operation"), the program as shown in FIG. 4A is executed in the control circuit 100. At a step S101 a flag k is set to an initial value "1". This flag k is used as an identifier for judging whether there is a brightness value usable for a photometry which is about to be carried out. "k=1" indicates absence of a calculated brightness value, and "k=0" indicates presence of a calculated brightness value.

If k=1, that is, absence of a calculated brightness value is judged at a step S102, at a step S103 the flag k is set to "0". Subsequently, at a step S104 the accumulation time t is set to a predetermined value of t1, and an accumulating operation by the photometric light-receiving device 9 is carried out. In this embodiment, t1 is set to 10 μs, so that the photometric range is set to EV10 through EV20. At a step S105, 240 photometric signals are read out through the transfer unit 92 and the current-to-voltage converter 93 in response to a predetermined charge read-out pulse which is generated in the timing circuit 95, converted to digital numerical values by the A/D converter 13 and then stored in a memory (not shown). In this embodiment, the resolution of the A/D conversion of the A/D converter 13 is limited to 10 bits, that is, the range of the output signal from the A/D converter 13 is set to 0 through 1023.

At a step S106, the accumulation time t of the second photometry in the case where there is no calculated brightness value is set to a predetermined value of t2, and the photometric accumulating operation of the light-receiving device 9 is carried out again. In this embodiment, t2 is set to 10 ms, so that the photometric range is set to EV0 through EV10. At a step S107, the photometric signals are read out like the step S105, and the data thus read out is stored in a memory.

At a step S108 two photometric outputs are combined. That is, since the photometric range at the accumulation time t=t1 is from EV10 to EV20 and the photometric range at the accumulation time t=t2 is from EV0 to EV10, on the basis of the two photometric results, a photometric signals whose dynamic range is from EV0 to EV20 is prepared. Specifically, 240 brightness data at t=t1 which are obtained at the step S105 are searched, and the photometric signal at t=t2 is used as a photometric result for a region whose photometric output is below the photometric lower-limit value, that is, below EV10, while the photometric output at t=t1 is used as a photometric result for a region whose photometric output is larger than the photometric lower-limit value. At this time, in order to correct an output difference due to the difference between the accumulation times, the data for t1 is multiplied by t2/t1. Thereafter, the process goes to a step S111.

On the other hand, if the flag k is not equal to "1" at the step S102, that is, if there is a brightness value which has been already calculated, the program goes to a step S109 to read out the accumulation time t from the memory and carry out the accumulating operation of the photometric light-receiving device 9 on the basis of the read-out accumulation time t. Here, the accumulation time t is calculated on the basis of the previous photometric output, and its calculation will be described later.

At a step S110, like the step S105 the photometric output is read out and stored into the memory, and at the step S111 the maximum value Vmax of the 240 photometric outputs (A/D converted values) which were obtained at the step S108 or S110 is calculated. If it is judged at the step S112 that Vmax=0, that is, if all of the A/D converted values are judged to be "0" and thus the calculation of the brightness value is impossible, at a step S113 the accumulation time is altered, and the photometry is carried out again. In this case, if in accordance with an equation (1) the accumulation time for a next photometry is set to a value which is obtained by multiplying the accumulation time for the previous photometry by $2^{10}$, that is, by 1024, it would be favorable because a data whose A/D converted value is equal to "1" in the previous photometry will become a data whose A/D converted value is equal to "1024" just exceeding the maximum value of the A/D converter 13.

$$t = 1024 \times t \qquad (1)$$

On the other hand, if it is judged at the step S112 that Vmax≠0, the program goes to a step S114, and a judgment is made whether Vmax<8 or not. If Vmax≧8, all of the individual photometric outputs are regarded as being effective to select the first calculation mode as described above, and then the program goes to a step S115. At the step S115, the brightness value is calculated in accordance with the first calculation mode. That is, the brightness values BV(h,v) of 240 regions are calculated by the following equation (2).

$$BV(h,v) = \log(V(h,v) \cdot k(h,v)/t)/\log(2) \qquad (2)$$

Here, V(h,v) represents the photometric output of a region which is located on an h-th column from the left side and a v-th row from the bottom of the matrix-formed photometric regions as shown in FIG. 3, and BV(h,v) represents the brightness value corresponding to the photometric output V(h,v). Further, the right side of the equation (2) is represented by the logarithmic value having base of "2" for the purpose of the conversion to the brightness value based on the APEX, and (EV) or (BY) is used as the unit of BV(h,v). Further, k(h,v) represents a correction coefficient which is obtained in the correction data calculating unit 16, and is a correction coefficient of each photometric region inherent to the photographing lens which is obtained from a maximum aperture, a position of a exit pupil, vignetting information (for example, vignetting factor of the photographing lens), etc. The correction coefficient has been beforehand obtained through experiment or simulation in correspondence with each photometric region.

Here, for regions whose A/D converted values are equal to "0", their values can not be directly substituted for the equation, and thus the brightness values therefor are calculated by replacing the A/D converted values with 0.5. That is, the regions whose A/D converted values are equal to "0" are regarded as having the brightness value (unit: BV) which is darker at one level than that of the region whose A/D converted value is equal to "1".

Subsequently, at a step S116 "1" is substituted for "i". "i" is used to store information as to which one of the first and second calculation modes is selected. If the first calculation mode is selected, "1" is substituted for "i" while for the selection of the second calculation mode, "2" is substituted for "i".

On the other hand, if it is judged at the step S114 that Vmax<8, that is, if it is judged that all of the photometric outputs are small and the occupational rate of the noise component is large, the program goes to a step S117 to judge whether the film advance mode is the single frame mode or the continuous mode. The identification of the film advance mode is carried out on the basis of the a setting state of the film advance mode switching means (not shown).

If the single frame mode is identified, the photometry can be carried out relatively slowly, so that the accumulation time t is altered at a step S118 and then the program returns to the step S102 to carry out the photometry again. In this case, as shown in an equation (3), if the next accumulation time t is set to a value of $2^7$ times (that is, 128 times) of the previous accumulation time, it would be favorable because data whose A/D converted value is equal to "8" in the previous photometry becomes data whose A/D converted value is equal to "1024" just exceeding the maximum value of the A/D converter 13.

$$t = 128 \times t \qquad (3)$$

On the other hand, if the continuous mode is identified, no surplus time to carry out the photometry again is provided, so that the second calculation mode is selected and then the program goes to a step S119. At the step S119, the brightness value is calculated on the basis of the current photometric output in accordance with the second calculation mode. That is, in this case, each photometric output is small and the occupational rate of the noise component is large, so that the individual calculation of the brightness value causes a large error. Therefore, as described above, the 240 photometric output values are averaged to offset the noise components thereof. Specifically, in accordance with the following equation (4), the average value of 240 A/D converted values may be obtained.

$$Vave = \Sigma V(h,v)/240 \qquad (4)$$

Here, h=1 to 20, v=1 to 12, $\Sigma$ represents a summation in a range of h=1~20 and v=1~12.

At a step S120, the average brightness value BVave is calculated using the calculated average value Vave.

$$BVave = \log(Vave \cdot k/t)/\log(2) \qquad (5)$$

The correction coefficient k may be calculated using the k(h,v) of the equation (2) as follows:

$$k = \Sigma k(h,v)/240 \qquad (6)$$

However, the value k for an average value may be beforehand separately provided.

At a step S121, "2" is substituted for "i" to store the selection of the second calculation mode, and subsequently the program goes to a step S122.

At the step S122, the proper exposure value BVans is calculated on the basis of the brightness value obtained at the step S115 or S120. The calculating method of BVans will be described later. At a step S123, the accumulation time t for a next photometry is calculated, and stored into a predetermined memory. This calculation method of the accumulation time will be described in detail later.

If it is judged at a step S124 that the release button as not shown is not fully pushed down (hereinafter referred to as "full push-down"), the program goes to a step S125 to judge whether the release button is pushed down halfway (i.e., the half push-down operation is carried out). If the release button is judged to be pushed down halfway, the program returns to the step S102. If the release button is judged not to be pushed down halfway, the processing is terminated. If it is judged to be the full push-down operation at the step S124, the program goes to a step S126 to drive the diaphragm 10 and the shutter 11 on the basis of the proper exposure value BVans obtained in the above method, thereby performing the exposure control. Thereafter, at a step S127 it is judged whether the single frame mode is selected or not, and if the judgment at the step S127 is "Yes", the processing is terminated. If the judgment at the step S127 is "No", that is, if the continuous mode is selected, the program returns to the step S102.

According to the procedure as described above, in a case where the maximum value vmax of the plural photometric outputs obtained by the photometric light-receiving device 9 is lower than "8" and the continuous mode is selected as the film advance mode, the second calculation mode is selected, and the brightness value BVave is calculated on the basis of the average value Vave of all photometric outputs. The averaging of the photometric outputs as described above enables the noise components having periodicity to be offset and thus substantially zero. Therefore, only the brightness value components can be taken out and the brightness value can be obtained with a certain degree of accuracy. The exposure value can be also calculated on the basis of the brightness value thus obtained. Accordingly, the exposure value can be rapidly obtained for the photographic operation in the continuous mode, and thus the high-speed photographic performance can be kept.

On the other hand, even when the maximum value Vmax of the photometric outputs is lower than "8", a surplus time is prepared for the single frame mode, and thus the photometry can be carried out again. Further, when the maximum value Vmax of the photometric outputs is above "8", the occupational rate of the noise component in each photometric output is negligibly small, and the first calculation mode is selected to calculate an individual brightness value on the basis of each photometric output. The exposure value is also calculated on the basis of the brightness values thus obtained in the manner as described later. Accordingly, the photographic operation can be carried out with a more suitable exposure value.

(6) Exposure Calculation

Figure 5:
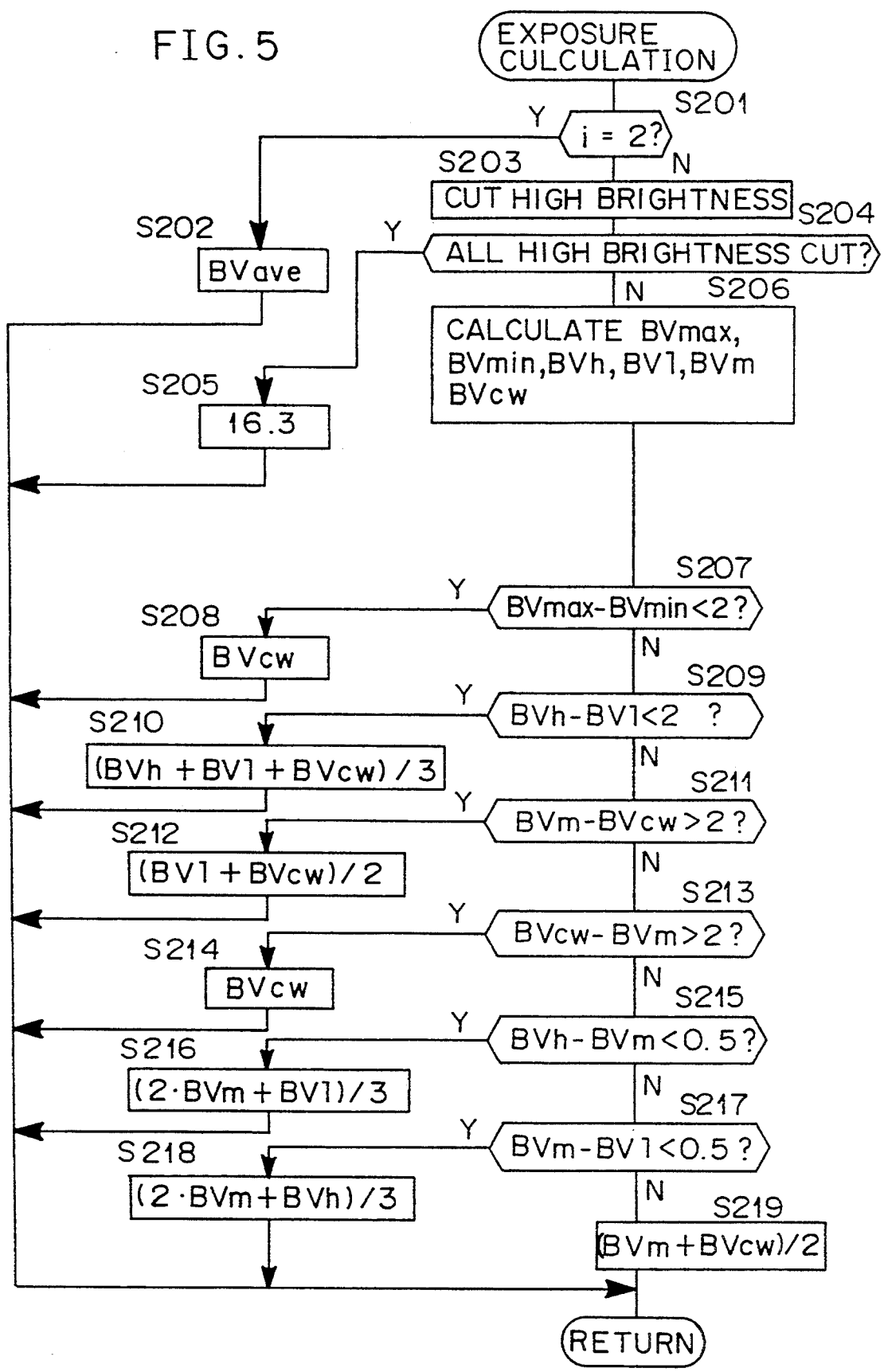
FIG. 5 is a flowchart for an exposure calculating subroutine of the first embodiment.

The details of the exposure calculation at the step S122 will be next described with reference to a flow-chart of a subroutine of FIG. 5.

It is judged at a step S201 whether i=2 or not. Since, for i=2, the 240 photometric outputs are averaged to obtain only one brightness value, the average brightness value BVave is substituted for the proper exposure value BVans at a step S202 to set the average brightness value as the proper exposure value. For i≠2, the program goes to a step S203 to replace with 16.3 EV those data which have brightness values which exceed 16.3 EV, of the 240 brightness values BV (h,v) obtained in correspondence with each photometric region. When a subject having ultrahigh brightness value exceeding 16.3 EV such as the sun exists in a photographic field, the ultrahigh brightness value affects the calculation of the exposure value strongly, and thus the above operation is a countermeasure for suppressing the strong affection of the ultrahigh brightness value at maximum.

At a step S204 it is judged whether all of 240 photometric data are replaced with 16.3 EV or not. If the judgment at the step S204 is "YES", BVans is set to 16.3. If the judgment at the step S204 is "NO", at a step S206 BVmax, BVmin, BVh, BVl, BVm and BVcw are calculated from each brightness value BV(h,v). The contents of these variables are as follows.

BVmax: the maximum brightness value of 240 brightness values (not exceeding 16.3)

BVmin: the minimum brightness value of 240 brightness values

BVh: the average brightness value of 24 brightness values which are picked up according to degree from high to low in 240 brightness values BVl: the average brightness value of 24 brightness values which are picked up according to degree from low to high in 240 brightness values BVm: the average value of all of 240 brightness values BVcw: the average brightness value of brightness values corresponding to 36 regions (as indicated by "A" in FIG. 3) of $8 \leq h \leq 13$ and $4 \leq v \leq 9$, of 240 brightness values BV(h,v).

In this embodiment, the average value of 24 brightness values is calculated to obtain BVh and BVl, however, the number of the brightness values used in averaging is not limited to 24. For example, it may be more or less than 24. Likewise, the number of the brightness values for BVcw used in averaging is not limited 36, and it may be determined on the basis of brightness values which are located in the neighborhood of the center of the subject field.

At a step S207, it is judged whether BVmax-BVmin<2. If the judgment at the step S207 is "YES", since the difference between the maximum brightness value and the minimum brightness value is small, an object to be photographed can be regarded as having extremely flat brightness and an exposure value is similar even when a calculation thereof is made using the brightness value of any region. Therefore, at a step S208 the average brightness value BVcw of 36 brightness values corresponding to regions at the central portion which are highly reliable is substituted for the proper exposure value BVans to set the proper exposure value as the average brightness value of the central portion.

If the judgment at the step S207 is "NO", the program goes to a step S209 to judge whether BVh−BVl<2. If the judgment at the step S209 is "YES", since the difference between the brightness values of the high-brightness region and the brightness values of the low-brightness region is small and an object to be photographed can be regarded as having a substantially flat brightness, so that the proper exposure value BVans is calculated as follows at a step S210.

$$BVans=(BVh+BVl+BVcw)/3 \qquad (7)$$

If the judgment at the step S209 is "NO", the program goes to a step S211 to judge whether $BVm-BVcw>2$. If the judgment at the step S211 is "YES", it can be considered that the brightness value at the central portion is lower than the average brightness value, that is, the central portion is dark and backlight situation occurs, and the proper exposure value BVans is calculated as follows at a step S212.

$$BVans=(BVl+BVcw)/2 \qquad (8)$$

If the judgment at the step S211 is "NO", the program goes to a step S213 to judge whether $BVcw-BVm>2$. If the judgment at the step S213 is "YES", it can be considered that the brightness value at the central portion is larger than the average brightness value, that is, the central portion is bright and an object is under a spot light. Therefore, at a step S214, the average brightness value BVcw at the central portion is substituted for the proper exposure value BVans to set the average brightness value of the central portion to the proper exposure value.

If the judgment at the step S213 is "NO", the program goes to a step S215 to judge whether $BVh-BVm<0.5$. If the judgment at the step S215 is "YES", the difference between the brightness value corresponding to the high-brightness region and the average brightness value is small and an object to be photographed can be regarded as including a small dark subject in a photographic field. Accordingly, the proper exposure value BVans is calculated as follows at a step S216.

$$BVans=(2.BVm+BVl)/3 \qquad (9)$$

If the judgment at the step S215 is "NO", the program goes to a step S217 to judge whether $BVm-BVl<0.5$. If the judgment at the step S217 is "YES", the difference between the brightness value corresponding to the low-brightness region and the average brightness value is small and thus an object to be photographed can be regarded as including a small bright subject in a photographic field. Accordingly, the proper exposure value BVans is calculated as follows at a step S218.

$$BVans=(2.BVm+BVh)/3 \qquad (10)$$

If the judgment at the step S217 is "NO", an object to be photographed is not matched with any scene as described above, and thus it is regarded as a general scene. Accordingly, the proper exposure value BVans is calculated as follows at a step S219.

$$BVans=(BVm+BVcw)/2 \qquad (11)$$

(7) Calculation Method of Optimum Accumulation Time

Figure 6:
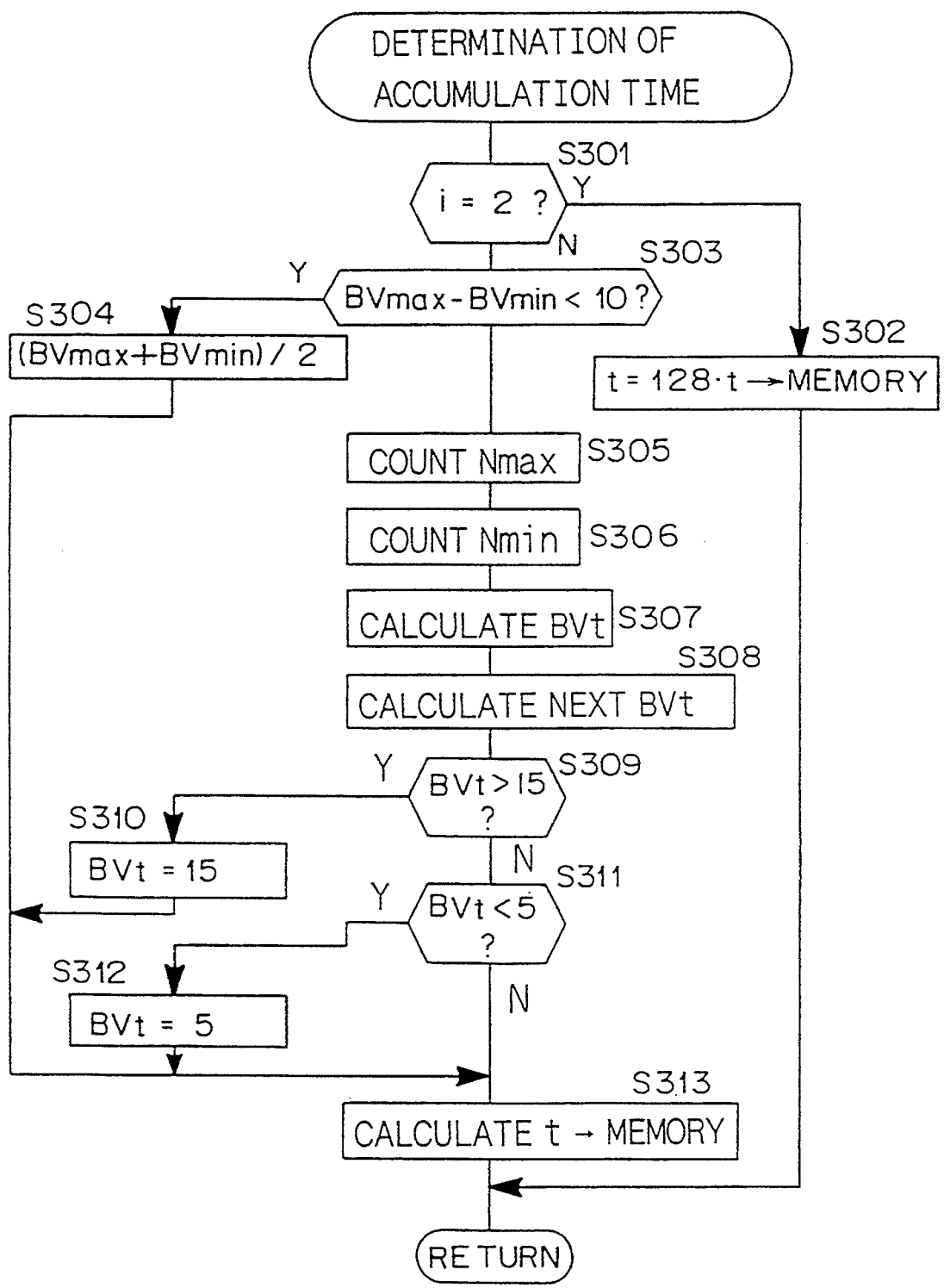
FIG. 6 is a flowchart for an accumulation time calculating subroutine of the first embodiment.

FIG. 6 shows the flowchart of a subroutine for the details of the accumulation-time calculation at the step S123 of FIG. 4B. At a step S301 it is judged whether "i" is equal to "2". For i=2, the A/D converted values of all photometric outputs are lower than "8", and a value of 128 times of the previous accumulation time t is prepared as the next accumulation time t (step S302). This is favorable because through the multiplication of the accumulation time t by 128, data whose A/D converted value is equal to "8" in the previous photometry becomes data whose A/D converted value is equal to 1024 just exceeding the maximum value of A/D converter 13.

On the other hand, if $i \neq 2$, it is judged at a step S303 whether $BVmax-BVmin<10$. If the judgment at the step S303 is "YES", all of 240 photometric outputs are regarded as being desirable, and a next photometric reference level BVt is calculated as follows at a step S304.

$$BVt=(BVmax+BVmin)/2 \qquad (12)$$

Here, the photometric reference level BVt represents the brightness value providing just a half of the saturation level of the photometric output when the photometry is carried out with a certain accumulation time, and for example it is equal to "15" when the photometric range is from EV10 to EV20.

Substituting BVt into the equation used at a step S313 as described later, an accumulation time for providing such a photometric range that BVt is equal to a half of the saturation level is calculated.

If the judgment at the step S303 is "NO", this means that in the previous photometry existed data which was equal to the photometric upper-limit value (the brightness value corresponding to the maximum value usable in the A/D converter 13) or below the photometric lower limit (the brightness value corresponding to the noise level of the A/D converter 13, ordinarily "1" or "2"), and thus the number Nmax of data having the above photometric upper-limit value in the previous photometry is counted at a step S305. Like the step S305, the number Nmin of data having a value below photometric lower-limit value in the previous photometry is counted at a step S306. At a step S307, the photometric reference level BVt in the previous photometry is calculated in accordance with the following equation.

$$BVt=\log(0.32/t)/\log(2) \qquad (13)$$

Here, t represents the accumulation time in the previous photometry. For example, BVt=5 for t=0.01.

Subsequently, at a step S308, the photometric reference level BVt for the next photometry is calculated using the previous photometric reference level as follows.

$$BVt=BVt+(Nmax-Nmin)/10 \qquad (14)$$

According to this equation, the next photometric reference level increases because the fact that Nmax is larger than Nmin means that the number of the data having the above upper-limit value is large, and inversely the next photometric reference level decreases because the fact that Nmin is larger than Nmax means that the number of the data having the value below the lower-limit value is large. In the equation (14), the value (Nmax−Nmin) is reduced by one-tenth to optimize shift degree of the level. However, in place of the value of "1/10", any proper value may be used.

At a step S309 it is judged whether $BVt>15$. If the judgment at the step S309 is "YES", the photometric reference level exceeds the photometric upper limit value, and thus the next photometric reference level BVt is set to the photometric upper limit value of "15" at a step S310. At this time, the photometry can be made within EV10 to EV20. If the judgment at the step S309 is "NO", the program goes to a step S311 to judge whether BVt<5. If the judgment at the step S311 is "YES", the photometric reference level falls below the photometric lower limit value, and thus the next photometric reference level BVt is set to the photometric lower limit value of "5" at a step S312. At this time, the photometry can be made within EV0 to EV10. On the other hand, if the judgment at the step S311 is "NO", the program goes to a step S313.

At the step S313, the next accumulation time t is calculated from BVt which is obtained at any one of the steps S304, S308, S310 and S312 in accordance with the following equation, and the thus-obtained t is stored at a predetermined address in a memory:

$$t = 0.32/2^{BVt} \quad (15)$$

This accumulation time t is an accumulation time with which a photometric range providing the value of BVt of a half of the saturation level is obtained, and the accumulation time t is shorter as the value of BVt is larger.

In the procedure as described above, the judgment processing at the steps S114 and S117 is carried out in the selection unit 19, the processing at the step S122 is carried out in the exposure calculating unit 18, the processing at the step S123 is carried out in the accumulation-time setting unit 12, the processing at the step S124 and subsequent steps thereto are carried out in the exposure control unit (not shown) and the other processing are carried out in the brightness calculating unit 17.

Second Embodiment

In the first embodiment as described above, when the maximum value Vmax of the photometric outputs is lower than "8" and the continuous mode is selected as the film advance mode, all of the photometric outputs are averaged to calculate the average brightness value. However, the average brightness value may be calculated using a part of the photometric outputs. Further, the photometric outputs may be grouped into plural groups to calculate the average photometric value of every group.

In view of the foregoing, according to the second embodiment of this invention as shown in FIGS. 9 to 12, in the second calculation mode of the first embodiment, the photometric region is divided into plural groups, and an average photometric value is calculated for each group. In this case, as the maximum value Vmax of the photometric outputs is reduced, the number of groups is stepwisely reduced. The other elements of the optical system, the light-receiving device, etc. are identical to those of the first embodiment. Those same elements are represented by the same reference numerals, and the detailed description thereof is omitted. The processing for the main algorithm, the exposure calculation and the accumulation-time calculation are partially overlapped with those of the first embodiment, and the detailed description of the overlapped portions is also omitted.

(1) Main Algorithm

FIG. 9 is a flowchart showing a main algorithm of this embodiment.

The program as shown in the flowchart of FIG. 9 is started at the time when the judgment at the step S112 of the first embodiment as shown in the flowchart of FIG. 4A is negated. First, at a step S401, it is judged whether the maximum value Vmax (of 240 photometric outputs obtained at the step S110)<64. If Vmax>64, all of the individual photometric outputs are regarded as being effective, and then the program goes to a step S402. At the step S402, like the step S115 of the first embodiment, the individual brightness value is calculated for each of 240 regions in accordance with the first calculation mode as described above. The calculation method of the brightness value for the first calculation mode is identical to that of the first embodiment as described above, and thus the description thereof is omitted. Subsequently, the program goes to step S403 to substitute "1" for a variable "1" for identifying the calculation mode, and then the program returns to the step S122 as shown in FIG. 4B.

On the other hand, if it is judged at the step S401 that Vmax<64, the program goes to a step S404 to judge whether Vmax<32. If 64>Vmax>32, on the basis of the judgment that all of the photometric outputs are slightly small and the percentage of the noise component is not negligible, the second calculation mode is selected, and then the program goes to a step S405. At the step S405, as shown in FIG. 11A, photometric average regions BA1 (each comprising 3×5 segments in vertical and horizontal directions respectively) which are obtained by equivalently dividing the light-receiving elements of 240 into 16 sections are set up, and each of 16 average brightness values is calculated from the average value of 15 photometric outputs which are obtained from the light-receiving segments located in each photometric average region BA1. The calculation method of the average brightness value is identical to that of the first embodiment, and the description thereof is omitted. Subsequently, the program goes to a step S406 to substitute "2" for the variable "i" for judging the calculation mode and store the selection of the photometric average regions BA1 and the second calculation, and the program returns to the step S122.

On the other hand, if it is judged at the step S404 that Vmax<32, the program goes to a step S407 to judge whether Vmax<16. If 32>Vmax>16, on the basis of the judgment that all the photometric outputs are further small and the occupational rate of the noise component is not negligible, the second calculation is selected, and the program goes to a step S408. At the step S408, as shown in FIG. 11B, photometric average regions BA2 (each comprising 6×10 segments in the vertical and horizontal directions respectively) which are obtained by equivalently dividing 240 light-receiving segments into four sections are set up, and each of four average brightness values is calculated from the average value of 60 photometric outputs obtained from the light-receiving segments located in each photometric average region BA2. Subsequently, the program goes to a step S409 to substitute "3" for "i" for judging the calculation mode and store the selection of the photometric average regions BA2 and the second calculation mode, and then the program returns to the step S122.

On the other hand, if it is judged at the step S407 that Vmax<16, the program goes to a step S410 to judge whether Vmax<8. If 16>Vmax>8, on the basis of the judgment that all of photometric outputs are smaller and the percentage of the noise component is very large, the second calculation mode is selected, and then the program goes to a step S411. At the step S411, as shown in FIG. 11C, photometric average regions (each comprising 6×20 segments in vertical and horizontal directions respectively) obtained by equivalently dividing 240 light-receiving elements into two section are set up, and each of two average brightness values is calculated from the average value of 120 photometric outputs obtained from the light-receiving segments located in each photometric average region BA3. Subsequently, the program goes to a step S412 to substitute "4" for the variable "i" for the calculation mode judgment and store the selection of the photometric average region BA3 and the second calculation mode, and then the program returns to the step S122 as shown in FIG. 4B.

On the other hand, if it is judged at the step S410 that Vmax<8, that is, if it is judged that all of the photometric outputs are very small and the percentage of the noise component is extremely large, the second calculation mode is selected, and then the program goes to a step S413. At the step S413, like the first embodiment as described above, one average brightness value BVave is calculated from the average value of 240 photometric values in accordance with the second calculation mode. The photometric average region at the step S413 can be regarded as the whole of the 240 light-receiving segments. Subsequently, the program goes to a step S414 to substitute "5" for the variable "i" for calculation mode judgment and store the selection of the whole light-receiving segments as the photometric average region and the selection of the second calculation mode, and then the program returns to the step S122.

As described above, as the maximum level of the photometric output is reduced, the photometric average region for calculating the average brightness value is gradually widened to average the photometric outputs, so that both objects of removing the noise component and calculating the proper brightness value can be attained with avoiding the possibility that the proper brightness value would be not obtained.

(2) Exposure Calculation

Figure 10:
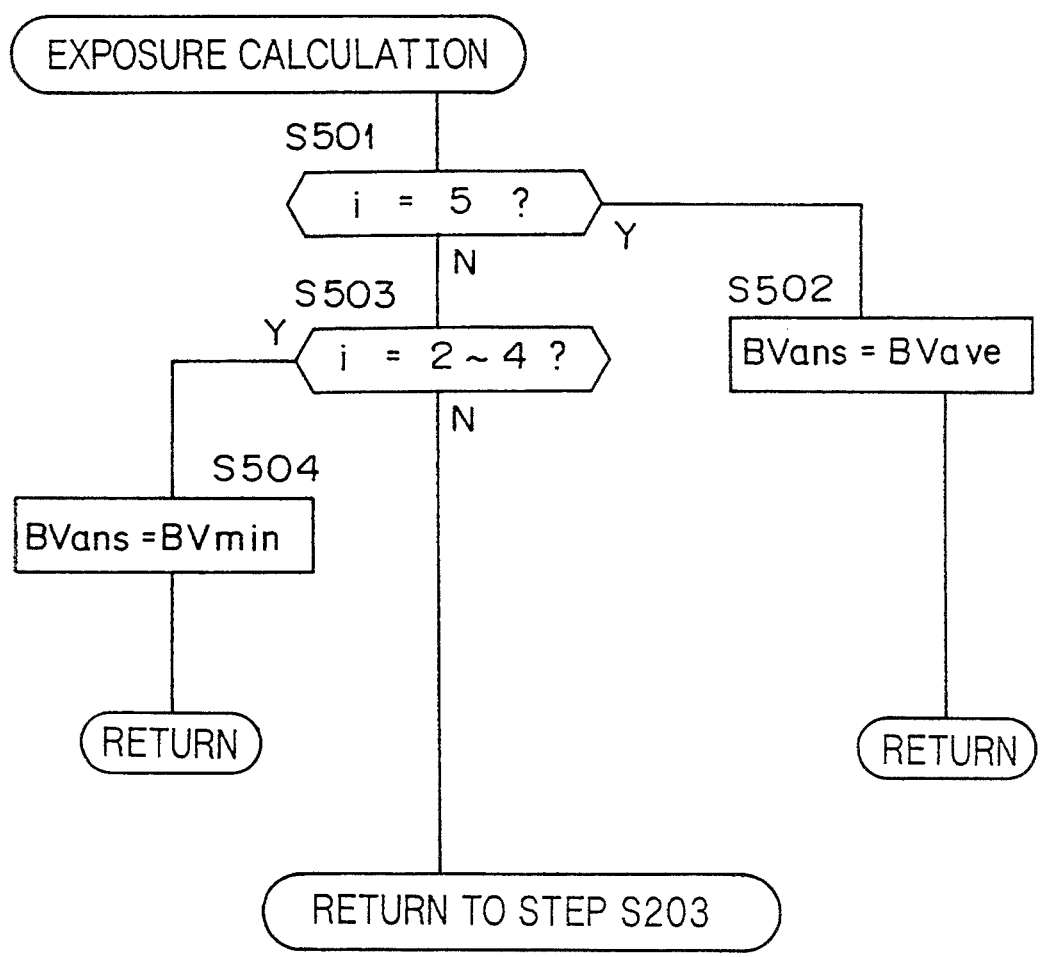
FIG. 10 is a flowchart for an exposure calculating subroutine of the second embodiment.
Figure 11:
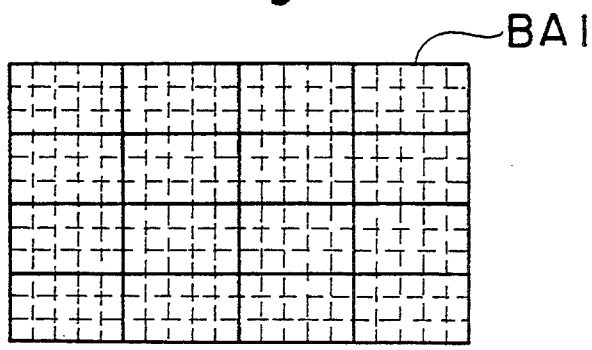
FIGS. 11A through 11C are diagrams showing a divisional manner of a photometric average region of the second embodiment.
Figure 11:
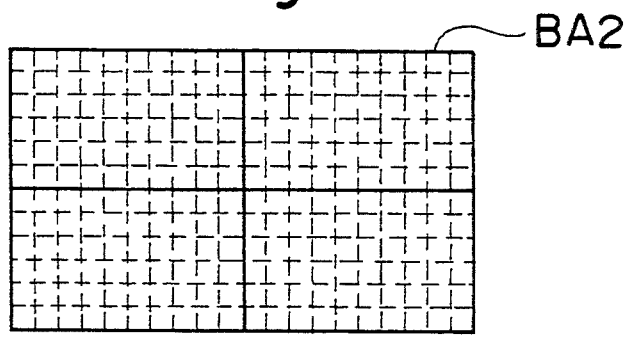
Figure 11:
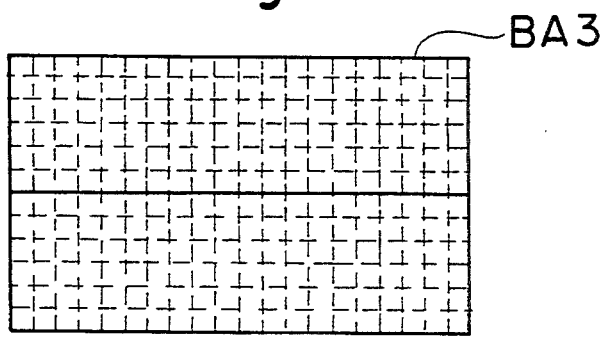

The details of the exposure calculation of this embodiment will be next described with reference to the flowchart of a subroutine as shown in FIG. 10.

The program as shown in the flowchart of FIG. 10 is started at the time when the program of FIG. 4B goes to the step S122. First, it is judged at a step S501 whether i=5. If i=5, Only one average brightness value is calculated by averaging 240 photometric outputs, and thus at a step S502 the average brightness value BVave is substituted for the exposure value BVans to set the average brightness value as the exposure value. If i≠5, the program goes to a step S503 to judge whether i=2~4. If i=2~4, 15 photometric outputs, 60 photometric outputs or 120 photometric outputs are respectively averaged to calculate 16 average brightness values, 4 average brightness values or 2 average brightness values, respectively, and thus BVmin is provided as the proper exposure value (step S504). BVmin represents the darkest brightness, that is, the lowest brightness value of the average brightness values thus obtained. This is because there is high possibility that a main subject exists at the darkest region in the photographic field. If i≠2~5, that is, i=1, all of 240 brightness values are obtained, and thus the program returns to the step S203 to obtain the proper exposure value in the same manner as the first embodiment as described above.

(3) Calculation Method of Optimum Accumulation Time

Figure 12:
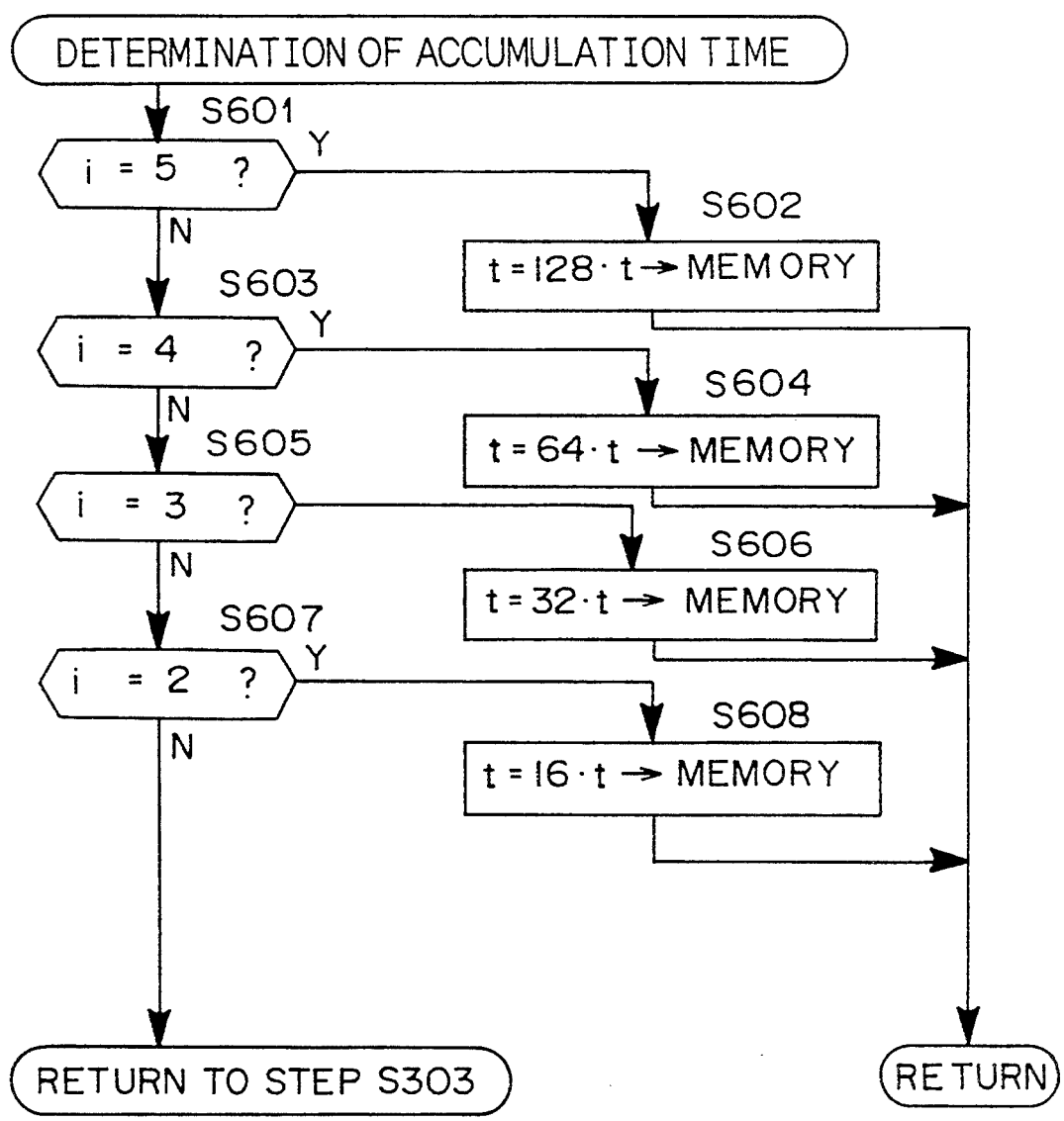
FIG. 12 is a flowchart for an accumulation time calculating subroutine of the second embodiment.

FIG. 12 is the flowchart of a subroutine showing the details of the accumulation-time calculation of this embodiment.

The program as shown in the flowchart of FIG. 12 is started at the time when the program of FIG. 4B goes to the step S123. First, at a step S601 it is judged whether i=5. If i=5, the A/D converted values of all photometric signals are lower than "8", and thus at a step S602, a value obtained by multiplying the previous accumulation time by 128 is provided as the next accumulation time t. As described above, this is because with the multiplication of t by 128, data whose A/D converted value is equal to "8" in the previous photometry would favorably become data whose A/D converted value is equal to 1024 just exceeding the maximum value in A/D converter 13.

On the other hand, if I≠5, it is judged at a step S603 whether i=4. If i=4, the A/D converted values of all the photometric signals are lower than "16" and thus, at a step S604, a value obtained by multiplying the previous accumulation time by 64 is provided as the next accumulation time t. The reason for the multiplication of the previous accumulation time by 64 is the same as the multiplication of the accumulation time t by 128 at the step S602 as described above.

If I≠4,5, it is judged at a step S605 whether i=3. If i=3, the A/D converted values of all the photometric signals are lower than "32", and thus at a step S606 a value obtained by multiplying the previous accumulation time by 32 is provided as the next accumulation time t.

Further, if i≠3~5, it is judged at a step S607 whether i=2. If i=2, the A/D converted values of all the photometric signals are lower than "64", and thus at a step S608 a value obtained by multiplying the previous accumulation time t by 16 is provided as the next accumulation time t.

If i≠2~5, the A/D converted values of all the photometric signals are above "64", and thus the program returns to the step S303 as shown in FIG. 6 to calculate the proper accumulation time in the same manner as the first embodiment as described above.

In the procedure as described above, the judgment processing at the steps S401, S404, S407 and S410 is carried out in the selection unit 19, the judgment processing at the steps S501 and S503 is carried out in the exposure calculating unit 18, and the judgment processing at the steps S601, S603, S605 and S607 is carried out in the accumulation-time setting unit 12.

Third Embodiment

Figure 15:
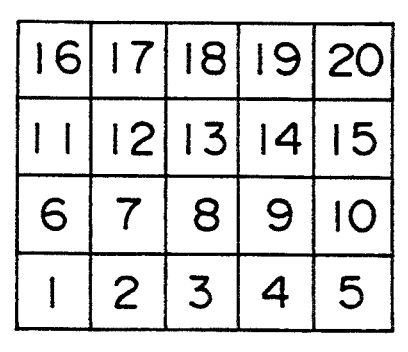

The third embodiment of this invention will be described with reference to FIGS. 13 to 15. In this embodiment, the grouping of the photometric region of the second embodiment as described above is modified. The modified portion will be described on the subject, and the common portion will be briefly described.

(1) Main Algorithm

Figure 13:
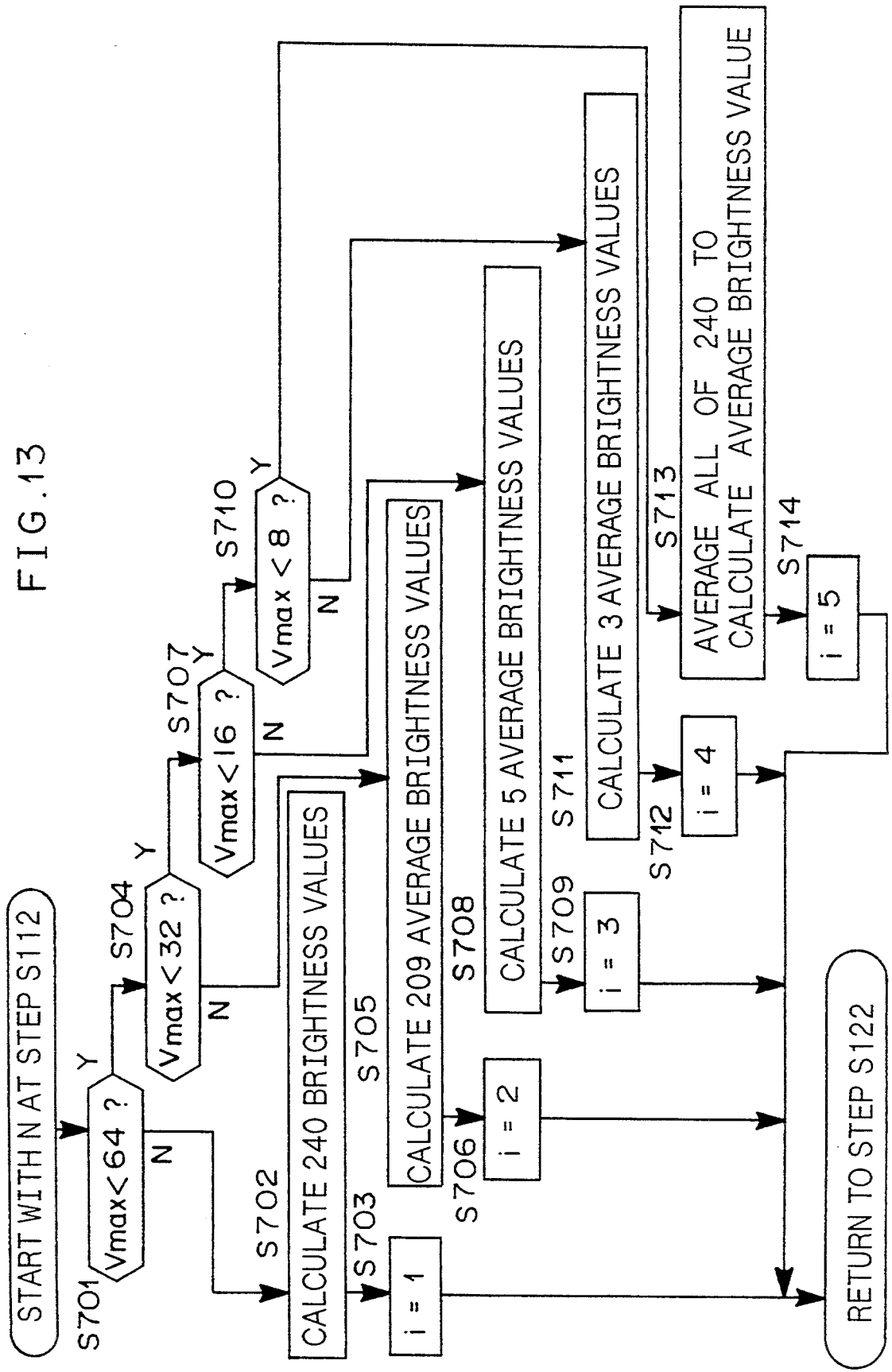
FIG. 13 is a main flowchart for an operation of a third embodiment.
Figure 14:
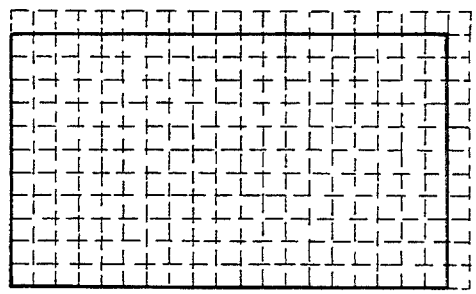
FIGS. 14A through 14C are diagrams showing a divisional manner of a photometric average region of the third embodiment.
Figure 14:
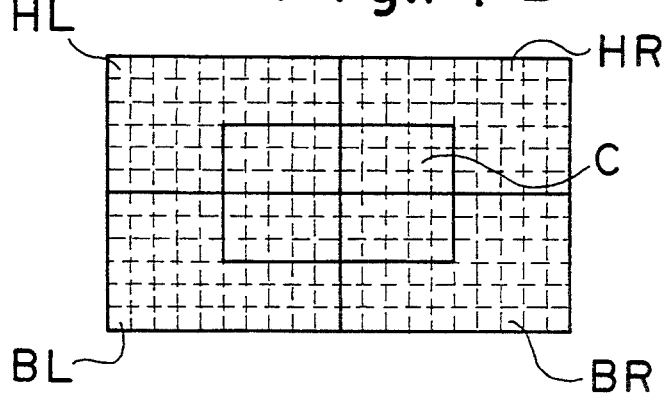
Figure 14:
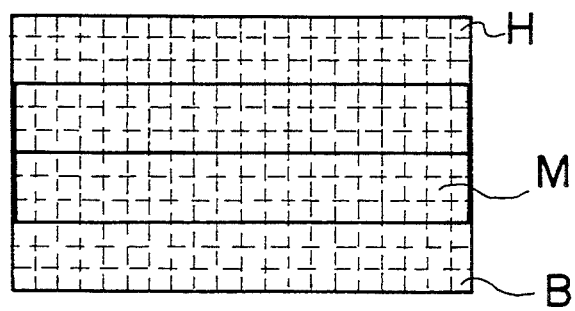

FIG. 13 is a flowchart for a main algorithm of this embodiment.

The program as shown in a flowchart of FIG. 13 is started at the time when the step S112 of the flowchart of FIG. 4A in the first embodiment is negated. First, at a step S701, it is judged whether the maximum value Vmax (of 240 photometric outputs obtained at the step S110)<64. If Vmax≧64, all of individual photometric outputs are regarded as being effective, and the program goes to a step S702. At the step S702, like the step S115 of the first embodiment, the individual brightness value is calculated for all of 240 regions in accordance with the first calculation mode as described above.

Subsequently, the program goes to a step S703 to substitute "1" for a variable "i" for calculation mode judgment, and then the program returns to the step S122 as shown in FIG. 4B.

On the other hand, if Vmax<64 at the step S701, the program goes to a step S704 to judge whether Vmax<32. If 64>Vmax>32, the second calculation mode is selected, and then the program goes to a step S705. At the step S705, photometric average regions each comprising 2×2 segments in vertical and horizontal directions are overlappingly set up in the 240 light-receiving segments, and the average brightness value is calculated from an average value of four photometric outputs which are obtained from light-receiving segments located at each photometric average region.

The procedure of setting the photometric average region will be described with reference to FIG. 15. FIG. 15 is a diagram showing any 20 segments which are picked up from the 240 light-receiving segments, and each segment is represented by a numeral (1 to 20). A first photometric average region includes four segments, that is, 1st, 2nd, 6th and 7th light-receiving segments, and the average value of the photometric outputs obtained from these four light-receiving segments is substituted for the photometric output of the first light-receiving segment to obtain its brightness value. This brightness value corresponds to the average brightness value for the 1st, 2nd, 6th and 7th four light-receiving elements. Subsequently, the photometric average region is parallel shifted by one segment to the right in FIG. 15, and the average value of photometric outputs from the 2nd, 3rd. 7th and 8th, four light-receiving segments is substituted for the photometric output obtained from the 2nd segment to calculate its brightness value. In the manner as described above, the photometric average region is successively shifted rightwardly and upwardly and the averaging operation is conducted for all of the 240 light-receiving segments. After the averaging operation, as shown in FIG. 14A 209 average brightness values, except for the segments on the uppermost row and the most right column, are calculated.

Upon setting up the photometric average regions overlappingly as described in this embodiment, the number of average brightness values can be increased in comparison with the case where the 240 light-receiving segments are equivalently divided to set the photometric average regions as described in the second embodiment (in the second embodiment, only average brightness values of 240/4=60 are obtained), and thus there is an advantage that the averaging process can be performed without reducing the resolution of the photometry.

Subsequently, the program goes to a step S706 to substitute "2" for the variable "i" for calculation mode judgment and store the selection of 209 photometric average regions and the second calculation mode, and then the program returns to the step S122 as shown in FIG. 4B.

On the other hand, if Vmax<32 at the step S704, the program goes to a step S707 to judge whether Vmax<16. If 32>Vmax>16, the program goes to a step S708. At the step S708, as shown in FIG. 14B, five photometric average regions C, HL, HR, BL and BR each comprising 6×10 segments in vertical and horizontal directions are overlappingly set up in the 240 light-receiving segments, and each of five average brightness values is calculated from the average value of 60 photometric outputs which are obtained from the light-receiving segments located at each of the photometric average regions C, HL, HR, BL and BR. Subsequently, the program goes to a step S709 to substitute "3" for the variable "i" for calculation mode judgment and store the selection of the photometric average regions C, HL, HR, BL and BR and the second calculation mode, and then the program returns to the step S122 as shown in FIG. 4B.

On the other hand, if Vmax<16 at the step S707, the program goes to a step S710 to judge whether Vmax<8. If 16>Vmax≧8, the program goes to a step S711. At the step S711, as shown in FIG. 14C, three photometric average regions H, M and B each comprising 6×20 segments in vertical and horizontal directions respectively are overlappingly set up in the 240 light-receiving segments, and each of three average brightness values is calculated from the average value of 120 photometric outputs which are obtained from the light-receiving segments located at each of the photometric average regions H, M and B. Subsequently, the program goes to a step S712 to substitute "4" for the variable "i" for calculation mode judgment and store the selection of the photometric average regions H, M and B and the second calculation mode, and then the program returns to the step S122.

On the other hand, if Vmax<8 at the step S710, the second calculation mode is selected, and then the program goes to a step S713. At the step S713, like the first embodiment as described above, one average brightness value BVave is calculated from the average value of 240 photometric values in accordance with the second calculation mode. Subsequently, the program goes to a step S714 to substitute "5" for variable "i" for calculation mode judgment and store the selection of all the light-receiving segments as the photometric average region and the selection of the second calculation mode, and then the program returns to the step S122. The subsequent processing are identical to those of the second embodiment as described above.

Fourth Embodiment

In the second and third embodiments, the photometric average regions for the grouping of the photometric regions are beforehand set. However, the following method may be adopted. That is, the photometric regions are grouped in accordance with the photometric output obtained from the photometric region, and the photometric outputs obtained from the photometric regions belonging to a group are averaged to calculate the average brightness value. Therefore, in the fourth embodiment as shown in FIGS. 16 to 26, the photometric region is grouped on real-time in accordance with a photometric result, and photometric outputs from photometric regions belonging to a group are averaged to calculate an average brightness value. The elements of the optical system, the light-receiving element, etc. other than the elements as shown are identical to those of the first embodiment as described above. These elements are represented by the same reference numerals and the description thereof is eliminated. The processing procedure for the main algorithm, the exposure calculation and the accumulation-time calculation are partially identical to those of the first embodiment, and the detailed description of these identical portions are omitted.

(1) Control System

Figure 16:
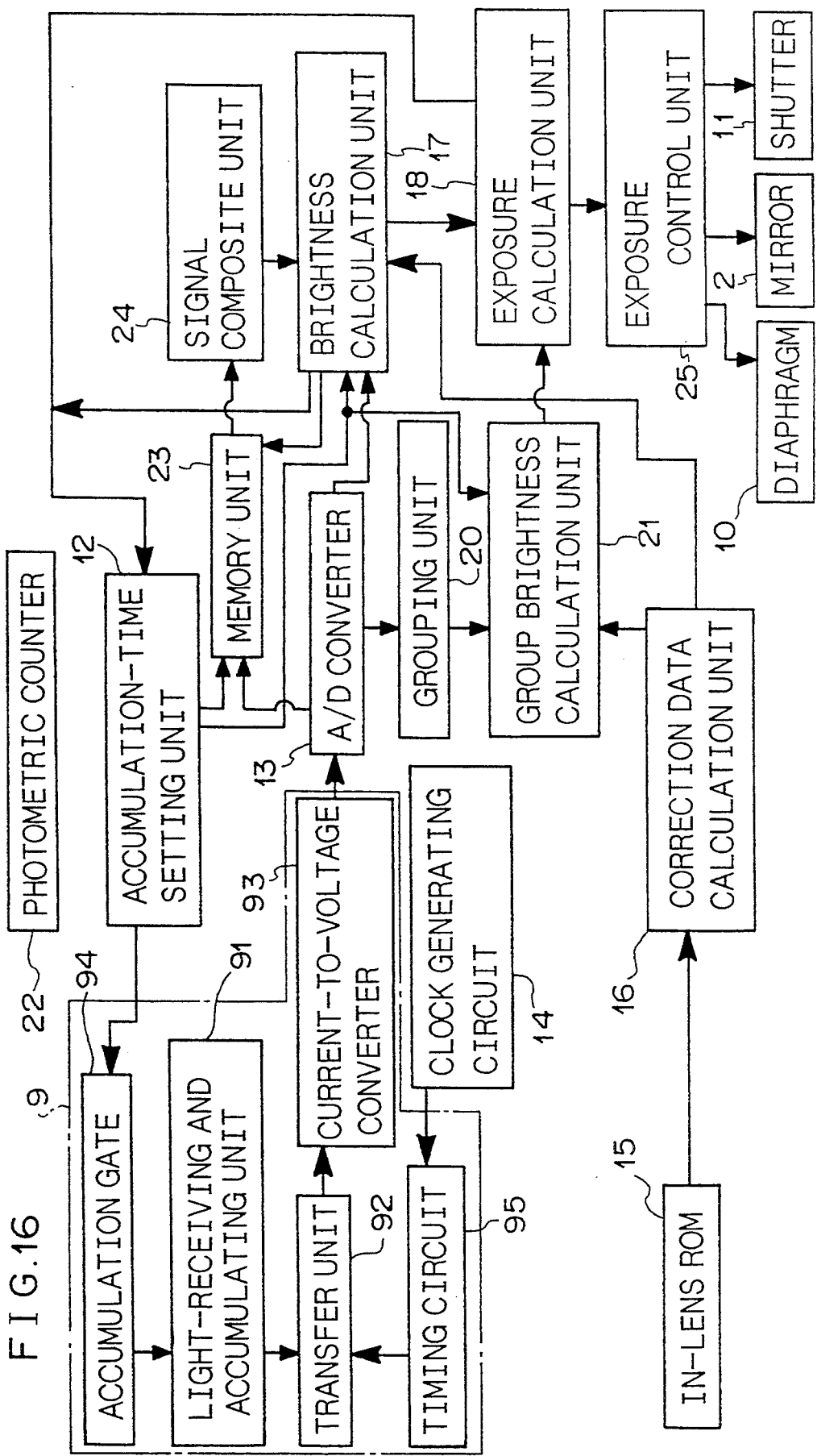
FIG. 16 is a block diagram showing a fourth embodiment of the brightness value calculating device according to this invention.

In FIG. 16, a grouping unit 20 serves to group a low-brightness region in a photographic field on the basis of a photometric output from each segment of a photometric light-receiving device 9, that is, a digital numerical signal output from an A/D converter 13. The details of the grouping operation will be described later. A group brightness calculation unit 21 serves to detect a brightness value for all segments belonging to a group grouping by the grouping unit 20. In more detail, signal on group is input from the grouping unit 20, and a brightness value as a group unit is calculated on the basis of the signal from an accumulation-time setting unit 12 and a correction data calculation unit 16.

An exposure calculation unit 18 serves to carry out an exposure calculation on the basis of a brightness value for each segment which is calculated by the brightness calculation unit 17 and a brightness value on group basis which is calculated by the group brightness calculation unit 21, thereby calculating a proper exposure value. The details of the exposure calculation will be described later.

A photometric counter 22 serves to identify for judging whether there is a brightness value usable for a photometry which is about to be carried out, and a memory unit 23 serves to store a setting time of the accumulation-time setting unit 12, a digital numerical signal (photometric output) converted by the A/D converter 13 and a brightness value calculated by the brightness calculation unit 17. A signal composite unit 24 serves to unite (combine) photometric outputs stored in the memory unit 23. The uniting method is identical to that of the first embodiment, and thus the description thereof is omitted.

An exposure control unit 25 serves to calculate an aperture and a shutter speed for the proper exposure value on the basis of a signal from the exposure calculation unit 18. Upon full push-down operation of the release button (not shown), the mirror 2 is leapt up and the diaphragm 10 and the shutter 11 are controlled in accordance with the proper exposure value as described above, thereby performing the exposure control.

(2) Main Algorithm

Figure 17:
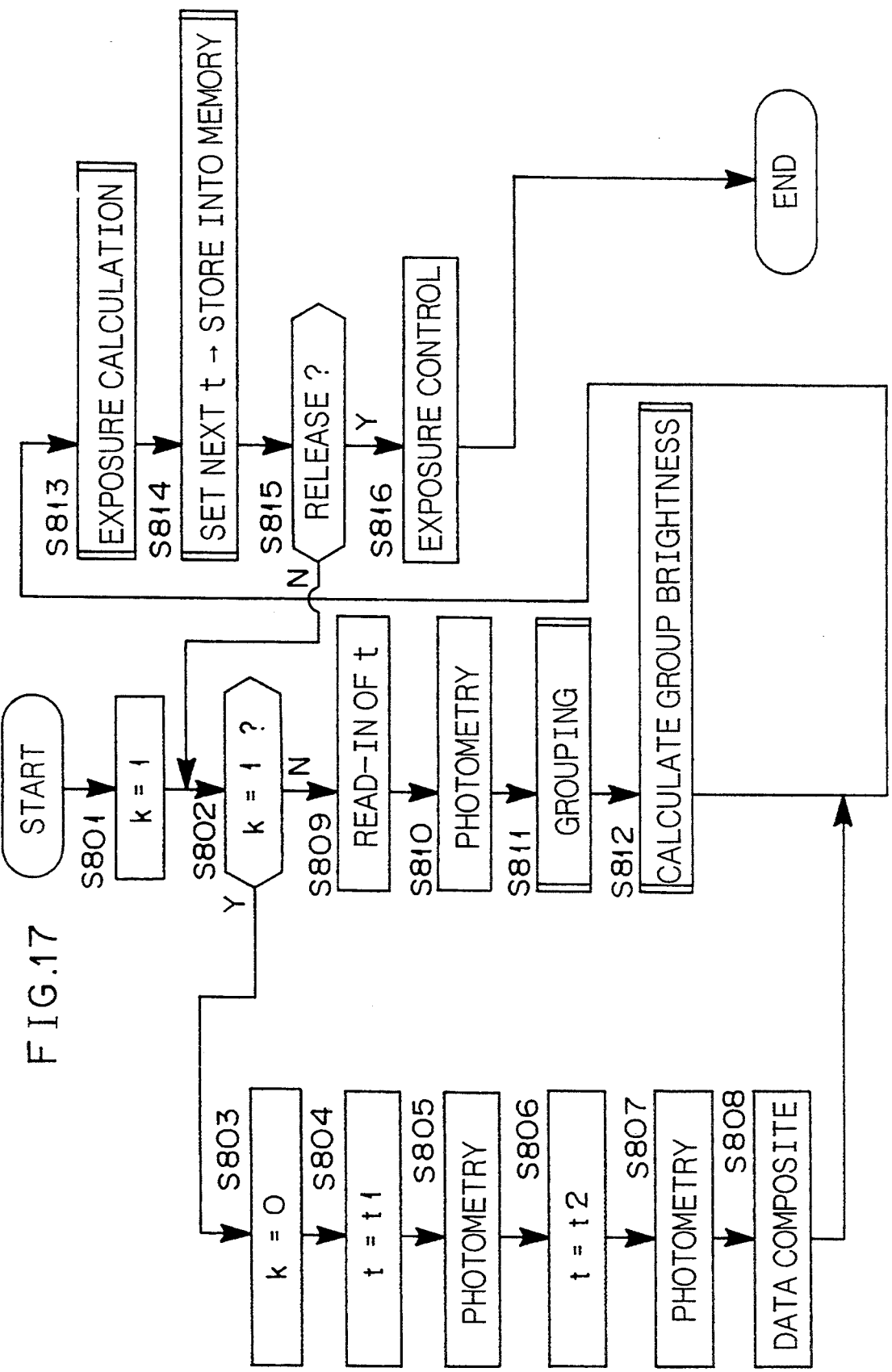
FIG. 17 is a main flowchart for an operation of the fourth embodiment.

FIG. 17 shows a flowchart for a main algorithm of a microcomputer when the accumulation-time setting unit 12 and the respective parts 13, 16 to 25 as shown in FIG. 16 are constructed by one microcomputer.

For example, upon the half push-down of the release button, the program as shown in FIG. 17 is started. First, at a step S801, the photometric counter 22 sets a flag k to an initial value "1". This flag k represents the number of photometries in the flowchart as shown in FIG. 17, and k=1 represents one photometry while k≠1 represents two or more photometries. In other words, k=1 indicates absence of a calculated brightness value for a photometry which is about to be carried out, and k≠1 indicates presence of a calculated brightness value.

At a step S802, the photometric counter 22 judges whether k=1. If k=1, that is, absence of a calculated brightness value is judged, then the program goes to a step S803, and if k≠1, that is, presence of a calculated brightness value is judged, then the program goes to a step S809.

At the step S803, the photometric counter 22 substitutes "0" for the flag k (k=0), and subsequently at the step S804 the accumulation-time setting unit 12 sets the accumulation time t to a predetermined value t1 to carry out the accumulating operation of the photometric light-receiving device 9. In this embodiment, t1 is set to 10 μs, so that the photometric range is set to EV10 through EV20. At the step S805, the photometry is carried out. That is, 240 signals are read out from the photometric light-receiving device 9 and then converted to digital numerical signals (photometric outputs V(h,v)) by the A/D converter 13. The brightness calculating unit 17 calculates the brightness value BV(h,v) for each photometric region using the equation (2) on the basis of a predetermined correction value (h,v), a photometric output V(h,v) and an accumulation time t=t1. The photometric output V(h,v) and the brightness value BV(h,v) are stored in the memory unit 23.

At the step S806, the accumulation-time setting unit 12 sets the accumulation time t to a predetermined value t2 to conduct the accumulating operation of the photometric light-receiving device 9 again. In this embodiment, t2 is set to 10 ms, the photometric range is set to EV0 through EV10. At the step S807, the photometry is carried out like the step S805. The photometric output V(h,v) and the brightness value BV(h,v) calculated at the step S807 are stored in a region which is different from that for the photometric output V(h,v) and the brightness value BV(h,v) calculated at the step S805.

At the step S808, the respective photometric outputs and the brightness values are united or combined by the signal composite unit 24. The uniting method is identical to that of the first embodiment as described above, and thus the description thereof is omitted. With the brightness value, the brightness value of t1 is added with $\log(t2/t1)/\log(2)$.

On the other hand, if at the step S802 k≠1, that is, if there is a brightness value which has been already calculated, the program goes to a step S809, and the accumulation-time setting unit 12 reads out the accumulation time t from the memory unit 23 to conduct the accumulating operation of the photometric light-receiving device 9 on the basis of this accumulation time. Here, the accumulation time read out from the memory unit 23 is a value which is calculated at a step S814 on the basis of the photometric output of the previous photometry, and the calculation method will be described later.

At a step S810, the photometry is carried out like the step S805, and the photometric output V(h,v) and the brightness value BV(h,v) are stored in the memory unit 23. At a step S811, on the basis of the photometric output V(h,v) the grouping unit 20 picks up a photometric region which seems to have low brightness and therefore large photometric error, and the region is subjected to a grouping operation. The details of the grouping operation will be described later. At a step S812, the group brightness calculating unit 21 calculates the brightness value of a group which is grouped at the step S811. The calculation method of the group brightness value will be also described later.

At a step S813, the exposure calculation unit 18 calculates the proper exposure value BVans on the basis of the brightness value obtained at the steps S808, and S812 if necessary. The calculation method of the proper exposure value BVans will be also described later. At a step S814, the accumulation-time setting unit 12 calculates the accumulation time t for the next photometry, and stores it into the memory unit 23. The accumulation-time calculating method is identical to that of the first embodiment as described above, and thus the description thereof is omitted.

At a step S815, it is judged whether the release button (not shown) is fully pushed down or not. If it is judged not to be fully pushed down, the program returns to the step S802 to repeat the operation as described above. On the other hand, if it is judged to be fully pushed down, the program goes to a step S816 so that the exposure control unit 25 drives the diaphragm 10 and the shutter 10 on the basis of the proper exposure value BVans obtained at the step S813, thereby performing the exposure control.

(3) Grouping Processing

Next, the grouping processing at the step S811 will be described with reference to the flowchart of the subroutine shown in FIG. 18.

A variable G(h,v) in a step S901 represents an integer-type of variable indicating whether a photometric region at an address (h,v) on a h-th column from the left side and a v-th row from the lower side in FIG. 3 is subjected to a grouping operation or not, and at the step S901 "0" is substituted for all photometric regions to conduct initialization. "0" indicates that the photometric region at the address (h,v) does not belong to any group, and "1" indicates that the photometric region at the address (h,v) is grouped.

A variable GN(h,v) in a step S902 represents an integer-type of variable indicating the group to which the photometric region at an address (h,v) belongs, that is, indicating the group name, and in this case "0" is substituted for all the photometric regions to conduct the initialization. "0" indicates that the photometric region at the address (h,v) does not belong to any group.

A variable FLG(i) in a step S903 represents a logical type of variable indicating whether a group having a group number of "i" is combined or united with another group, and in this case "0" is substituted for all variables to conduct the initialization. "0" indicates that the group whose group number is "i" is combined with another group. The combination operation of the groups will be described later. When a group exists independently of another group, "1" is substituted. "i" represents an integer-type variable representing a group number, and its maximum value i=h×v/2.

Subsequently, the program goes to a step S904, and "1" is substituted for variables h and v respectively to specify a photometric region on a first column from the left side and a first row from the lower side in FIG. 3, and "0" is substituted for the group number i at an address (1,1) to conduct the initialization.

At a step S905, it is judged whether the photometric output V(h,v) at the address (h,v) is lower than "3" or not. If the judgment at the step S905 is "YES", then it is judged that the percentage of the noise in the photometric output V ( h, v ) is large and thus the a measurement error is large, so that "1" is substituted for the variable G(h,v) at the address (h,v) at the step S906, thereby grouping the photometric region at the address (h,v). On the other hand, if the judgment at the step S905 is "NO", then it is judged that the percentage of the noise in the photometric output is small, and thus the program goes to a step S914 while the variable G(h,v) is kept to be equal to "0".

At a step S907 which is subsequent to the step S906, it is judged whether v=1 or not, that is, the photometric region at the address (h,v) is a region on a first row from the lower side of FIG. 3 or not. If the judgment at the step S907 is "YES", the program goes to a step S908. If the judgment at the step S907 is "NO", the program goes to a step S911. At the step S908, it is judged whether h=1 or not, that is, the photometric region at the address (h,v) is a region on a first column from the left side of FIG. 3 or not. If the judgment at the step S908 is "YES", the program goes to a step S909. If the judgment at the step S908 is "NO", the program goes to a step S910.

At the step S909, it is judged that the photometric region at the address (1,1) is grouped. This group is a first group, so that the group renewing processing as described later is conducted on this group, and then the program goes to a step S914. At the step S910, it is judged that a photometric region at an address (h>1, 1) which is located on the first row from the lower side of FIG. 3, but not located on the first column from the left side of FIG. 3 is grouped, so that the processing for group identification 1 as described later is conducted, and then the program goes to the step S914.

On the other hand, at a step S911, it is judged whether h=1 or not, that is, the photometric region at the address (h,v) is a region on the first column from the left side of FIG. 3 or not. If the judgment at the step S911 is "YES", the program goes to a step S912. If the judgment at the step S911 is "NO", the program goes to a step S913.

At the step S912, it is judged that the photometric region at an address (1, v>1) which is located on the first column from the left side of FIG. 3, but not located on the first row from the lower side of FIG. 3 is grouped, so that the processing for group identification 2 as described later is conducted, and then the program goes to the step S914. At a step S913, it is judged that the photometric region at an address (h>1, v>1) which is located on the second or subsequent column from the left side of FIG. 3 and the second or subsequent row from the lower side of FIG. 3 is grouped, so that the processing for group identification 3 as described later is conducted, and then the program goes to the step S914.

At the step S914, it is judged whether h=20 or not, that is, the photometric region at the address (h,v) is located on a 20th column from the left side of FIG. 3 or not. If the judgment at the step S914 is "YES", the program goes to a step S916. If the judgment at the step S914 is "NO", the program goes to a step S915. At the step S915, a variable h is incremented by "1", and then the program returns to the step S905. Thereafter, the same processing for the grouping necessity judgment as described above is executed for a photometric region which is just adjacent to the above photometric region to the right.

When at the step S914 as described above the photometric region is located on a v-th row from the left side and a 10th column from the left side for example, at the step S915 the photometric region is shifted to a region on a 11th column from the left side, and the program returns to the step S905 to carry out the processing for the grouping necessity judgment for the region on the v-th row from the lower side and the 11th column from the left side in the same manner as described at the step S905.

On the other hand, at a step S916, it is judged whether v=12 or not, that is, the photometric region at the address (h,v) is located on a 12th row from the lower side of FIG. 3 or not. If the judgment at the step S916 is "NO", the program goes to a step S917 to increment a variable v by "1" and initialize the variable h, and then the program returns to the step S905. Thereafter, the same processing for the grouping necessity judgment as described above is executed for a region on the first column from the left side of FIG. 3 and the (v+1)-th row from the lower side of FIG. 3.

If the judgment at the step S916 is "YES", it is judged that the grouping necessity judgment has been completed for all the photometric regions as shown in FIG. 3, and returning to the flowchart of FIG. 17, the program goes to a step S812 as shown in FIG. 17.

The details of the group renewing processing at the step S909 will be described with reference to the flowchart of the subroutine shown in FIG. 19.

At a step S1001, the integer-type variable "i" representing the number of counting groups is incremented by "1", and at a step S1002 "1" is substituted for a variable FLG(i) representing the union (combination) or non-union of groups. At a step S1003, the group number "i" is substituted for a variable GN(h,v) representing the group name of the current photometric region. Thereafter, the program returns to the step S914 of FIG. 18.

Figure 20:
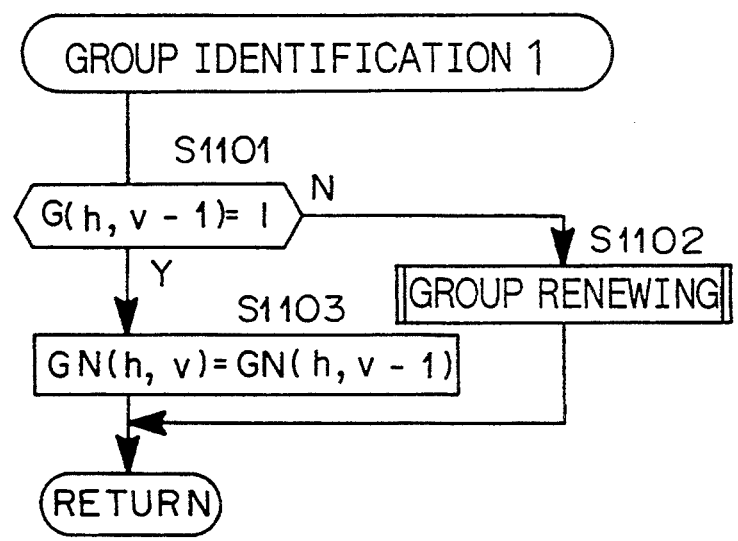
FIG. 20 is a flowchart for a processing subroutine of a group discrimination 1 of the fourth embodiment.

The details of the processing for group identification 1 at the step S910 will be described with reference to the flowchart of the subroutine shown in FIG. 20. As described above, the processing for group identification 1 is executed for the photometric region (h>1, 1) which is located on the first row from the lower side of FIG. 3 and the second or subsequent column from the left side of FIG.

At a step S1101, it is judged whether $G(h-1, v)=1$ or not, that is, a photometric region just adjacent to the photometric region concerned to the left (hereinafter referred to as "a left-adjacent photometric region") belongs to any group or not. This judgment is "YES" when the photometric region at the address (h−1, v) is grouped at the step S906 through the previous grouping necessity judgment, and then the program goes to a step 1103. If no-grouping is judged, the above judgment is "NO". Therefore, the program goes to a step S1102.

Figure 18:
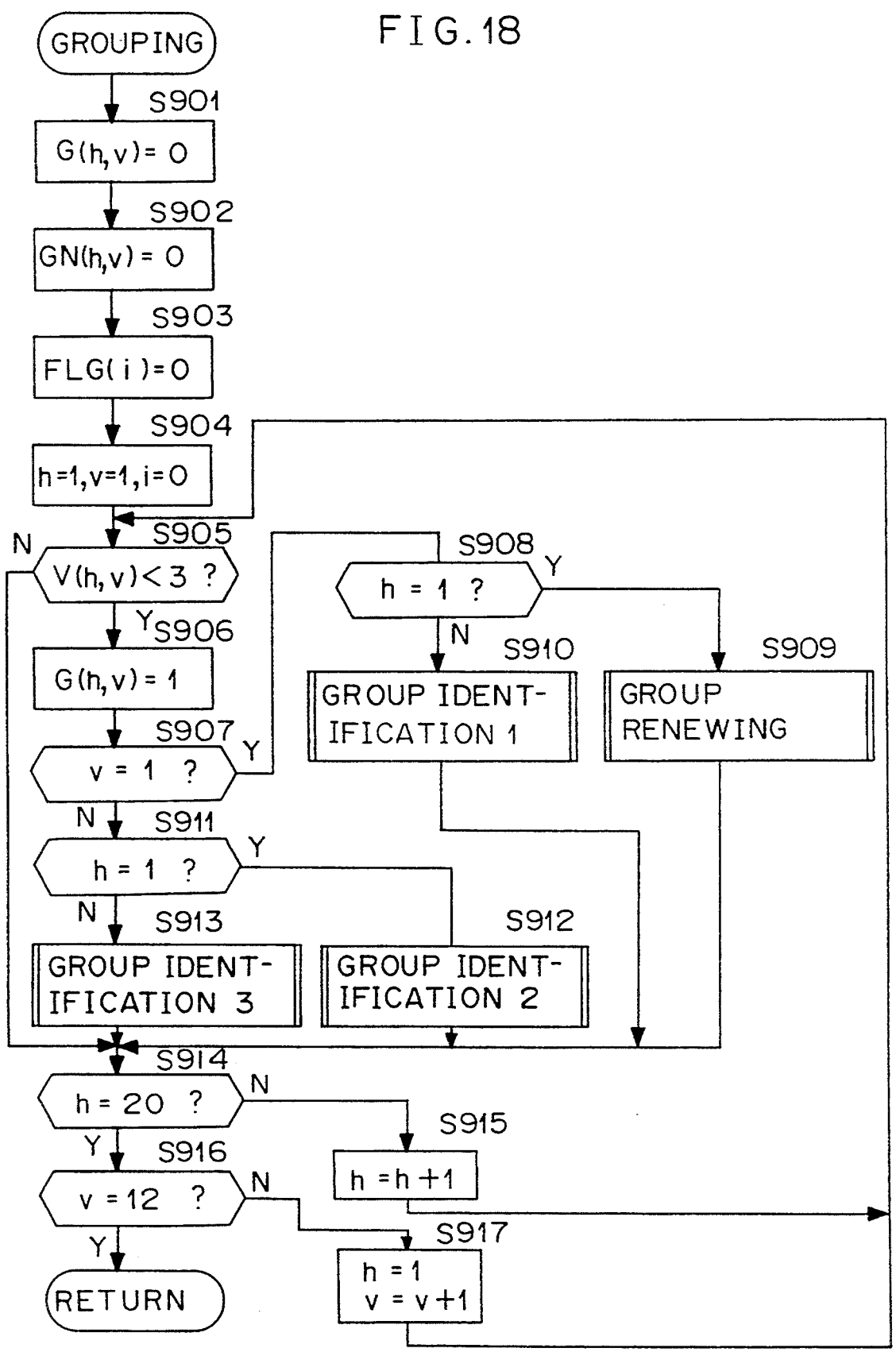
FIG. 18 is a flowchart for a grouping processing subroutine of the fourth embodiment.
Figure 19:
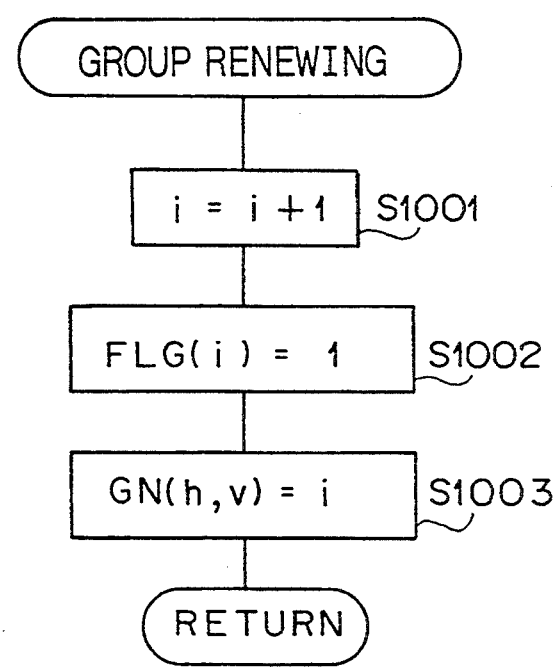
FIG. 19 is a flowchart for a group renewing processing subroutine of the fourth embodiment.

At the step S1102, the group renewing processing is conducted on the photometric region at the address (h,v) like the flowchart of FIG. 19. At the step S1103, the grouped photometric region at the address (h−1, v) and the photometric region at the address (h,v) concerned which is adjacent to the above photometric region to the right are adjacent to each other, so that for two adjacent regions, the respective group numbers thereof are set to be equal to each other in accordance with the equation (16). Thereafter, the program returns to the step S914 as shown in FIG. 18.

$$GN(h,v)=GN(h-1,v) \qquad (16)$$

Figure 21:
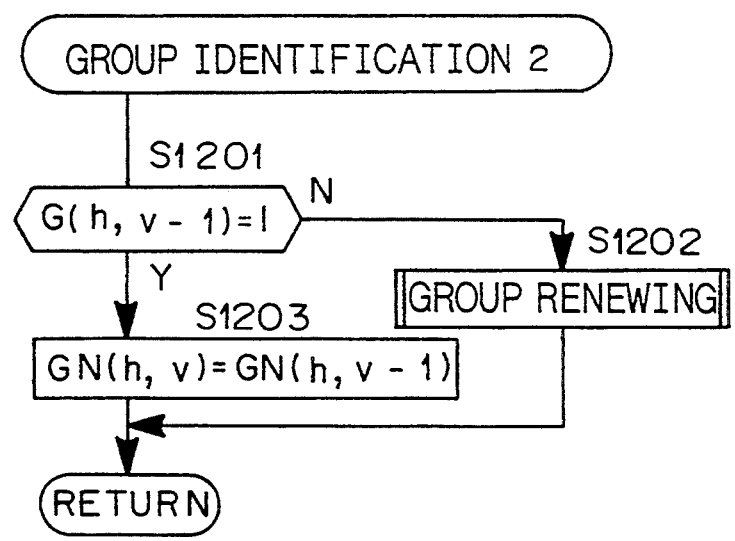
FIG. 21 is a flowchart for a processing subroutine of a group discrimination 2 of the fourth embodiment.

The details of the processing for group identification 2 at the step S912 will be described with reference to the flowchart of the subroutine shown in FIG. 21. As described above, the processing for group identification 2 is executed on those photometric regions (1, v>1) which are located on the second and subsequent rows of FIG. 3 and the first column from the left side of FIG. 3.

At a step S1201, it is judged whether $G(h,v-1)=1$ or not, that is, a photometric region just below the photometric region concerned (hereinafter referred to as "a just-below photometric region") belongs to any group or not. When through the previous grouping necessity judgment, the photometric region at the address (h,v−1) is grouped at the step S906 of FIG. 18, the above judgment is "YES", and the program goes to a step S1203. However, if the photometric region is not grouped, the above judgment is "NO" and the program goes to a step S1202.

At the step S1202, the group renewing processing is executed on the photometric region at the address (h,v) like the flowchart of FIG. 19. At the step S1203, the grouped photometric region at the address (h, v−1) and the photometric region at the address (h,v) concerned which is located just above the grouped photometric region are adjacent to each other, so that for the two adjacent regions, the respective group numbers thereof are set to be equal to each other in accordance with the equation (17). Thereafter, the program returns to the step S914 of FIG. 18.

$$GN(h,v)=GN(h,v-1) \qquad (17)$$

Figure 22:
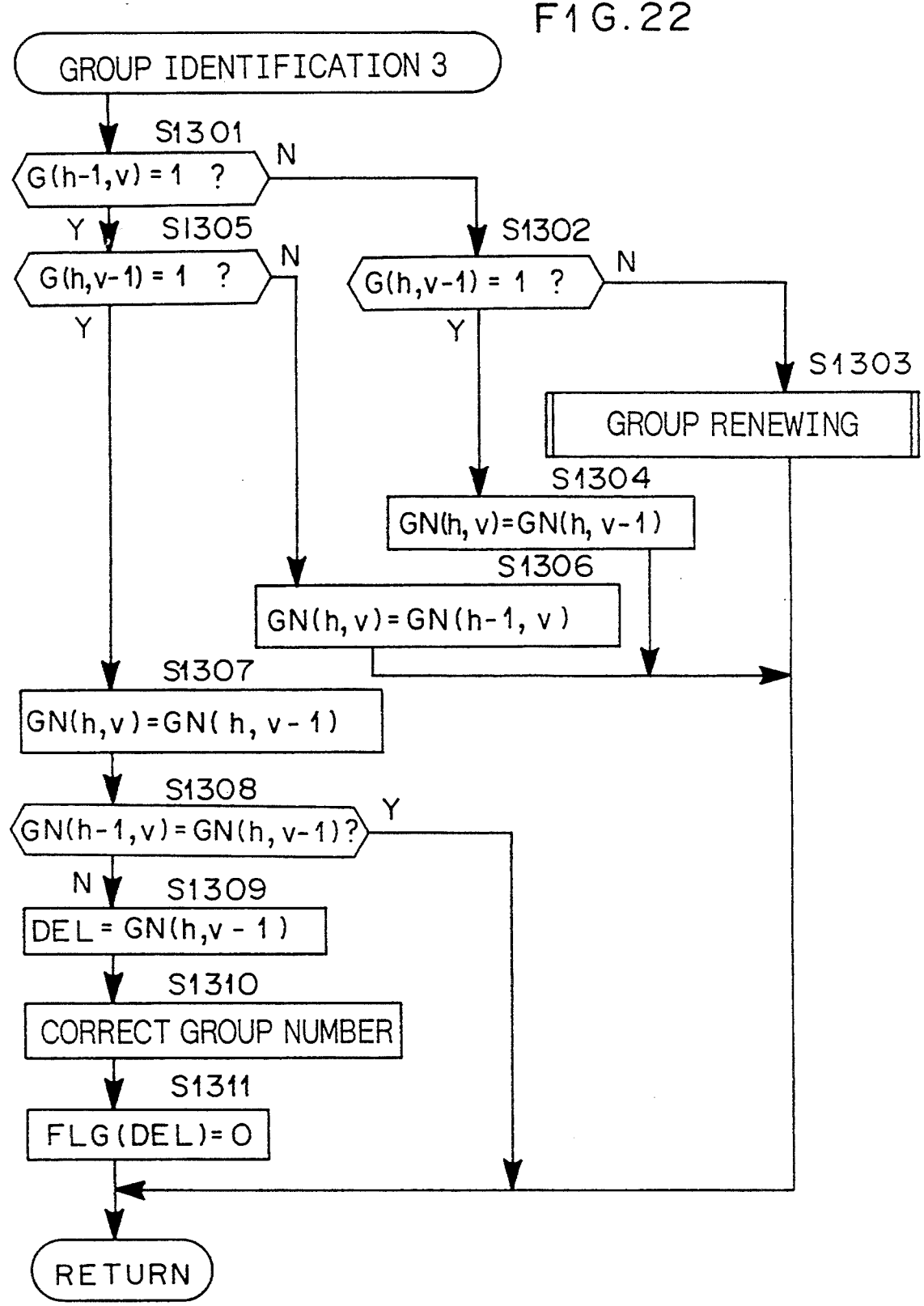
FIG. 22 is a flowchart for a processing subroutine of a group discrimination 3 of the fourth embodiment.

The details of the processing for group identification 3 at the step S913 will be described with reference to the flowchart of the subroutine shown in FIG. 22. As described above, the processing for group identification 3 is executed on the photometric regions (h>1, v>1) which are located on the second and subsequent rows from the lower side of FIG. 3 and the second and subsequent columns from the left side of FIG. 3.

At a step S1301, it is judged whether $G(h-1,v)=1$ or not, that is, the photometric region adjacent to the photometric region concerned to the left belongs to any group or not. When the photometric region at the address (h,v−1) belongs to a group, the above judgment is "YES", and the program goes to a step S1305. When the photometric region belongs to no group, the above judgment is "NO", and the program goes to a step S1302.

At the step S1302, it is judged whether $G(h,v-1)=1$ or not, that is, a just-below photometric region belongs to any group or not. When the photometric region at the address (h−1,v) belongs to a group, the above judgment is "YES", and the program goes to a step S1304. When the photometric region belongs to no group, the above judgment is "NO", and the program goes to a step S1303.

At the step S1303, on the basis of the negated judgments at the steps S1301 and S1302, it is judged that both of the left-adjacent and just-below photometric regions belong to no group. In this case, the group renewing processing is executed on the photometric region at the address (h,v) concerned like the flowchart of FIG. 19, and then the program returns to the step S914 of FIG. 18.

At the step S1304, on the basis of the negated judgment at the step S1301 and the positive judgment at the step S1302, it is judged that the left-adjacent photometric region belongs to no group and the just-below photometric region belongs to any group. In this case, the photometric region at the address (h,v) concerned and the just-below photometric region at the address (h,v−1) are adjacent to each other, so that for the two adjacent photometric regions, the respective group numbers thereof are set to be equal to each other in accordance with the equation (17). Thereafter, this program returns to the step S914 of FIG. 18.

At the step S1305, like the step S1302, it is judged whether $G(h,v-1)=1$ or not, that is, the just-below photometric region belongs to any group or not. When the photometric region at the address (h−1,v) belongs to any group, the above judgment is "YES", and the program goes to a step S1307. When photometric region belongs to no group, the above judgment is "NO", and the program goes to a step S1306.

At the step S1306, on the basis of the positive judgment at the step S1301 and the negated judgment at the step S1305, it is judged that the just-below photometric region belongs to no group, but the photometric region adjacent to the photometric region to the left belongs to any group. In this case, the photometric region at the address (h,v) concerned and the photometric region at the address (h−1,v) adjacent to the photometric region concerned to the left are adjacent to each other, so that for the two adjacent photometric regions, the respective group numbers thereof are set to be equal to each other in accordance with the equation (16). Thereafter, the program returns to the step S914 of FIG. 18.

At a step S1307, on the basis of the positive judgments at the steps S1301 and S1305, it is judged that both of the left-adjacent photometric region and the just-below photometric region belong to any groups. In this case, the group number of the photometric region at the address (h,v) concerned is set to be equal to that of the photometric region adjacent to the photometric region concerned to the left in accordance with the equation (16).

At a step S1308 subsequent to the step S1307, it is judged on the basis of the equation (18) whether the group number of the left-adjacent photometric region is equal to that of the just-lower photometric region or not.

$$GN(h-1, v) = GN(h, v-1) \quad (18)$$

The reason why this judgment processing is executed will be described with reference to FIG. 24.

Figure 24:
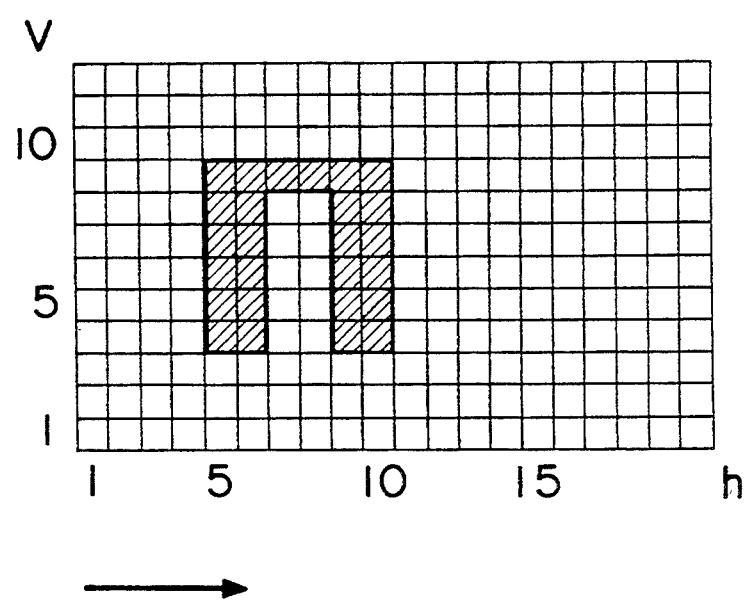
FIG. 24 is a diagram showing a processing of group union.

Now, it is assumed that a substantially U-shaped subject exists in a field and a photometric region as indicated by oblique lines as shown in FIG. 24 belongs to any group. In this embodiment, the photometric region is scanned from the region of h=1,v=1 to the right. Therefore, when the scanning operation reaches a region of h=5, v=4, the region is judged to belong to a group. Subsequently, when the scanning operation reaches a region of h=9, v=4, it is judged to belong to another group and thus it is provided with another group number.

That is, a subject on h=5, v=4 and a subject on h=9, v=4 are linked to each other at the upper portion. Although these subjects actually belong to the same subject (same group), this is recognized at the time when the scanning operation reaches a region on h=9, v=9, and until that time the counting is made on the basis of the judgment that these subjects belong to different groups. Accordingly, at the time when the scanning operation reaches the region on h=9, v=9 and the above is recognized (the equation (18) is negated), it is required that these groups are united and the group numbers are corrected.

When the equation (18) is satisfied, both of the left-adjacent and just-below photometric regions belong to the groups having the same group number, and thus it is unnecessary to correct the group numbers thereof. Therefore, the processing for group identification 3 is terminated and the program returns to the step S914 of FIG. 18. On the other hand, when the equation (18) is not satisfied, each of the left-adjacent and just-below photometric regions belongs to the groups having different group numbers respectively, and thus the correction of the group numbers is judged to be required. Therefore, the program goes to a step S1309 to carry out the processing for uniting the groups. The group uniting processing is carried out by substituting the number of a group to be extinguished (the number of the group in which the just-below photometric region belongs to, which is apparent from the above argument) for a variable DEL as shown in equation (19).

$$DEL = GN(h, v-1) \quad (19)$$

Subsequently, the program goes to a step S1310 to carry out the processing for group number correction. That is, the group number $GN(h,n-1)$ of the region $(h,v-1)$ and the group number $GN(x,y)$ of a region $(x,y)$ having the same group number $GN(h,n-1)$ as that of the region $(h,v-1)$ are rewritten by the same group number as $GN(h,v)$ over the region which have been already scanned.

After the processing for group number correction, the program goes to a step S1311 to substitute "0" for the variable FLG (DEL) and extinguish the group of the group number DEL as shown in equation (20).

$$FLG(DEL) = 0 \quad (20)$$

Thereafter, the program returns to the step S914 of FIG. 18.

(4) Processing for Group Brightness Calculation

Figure 23:
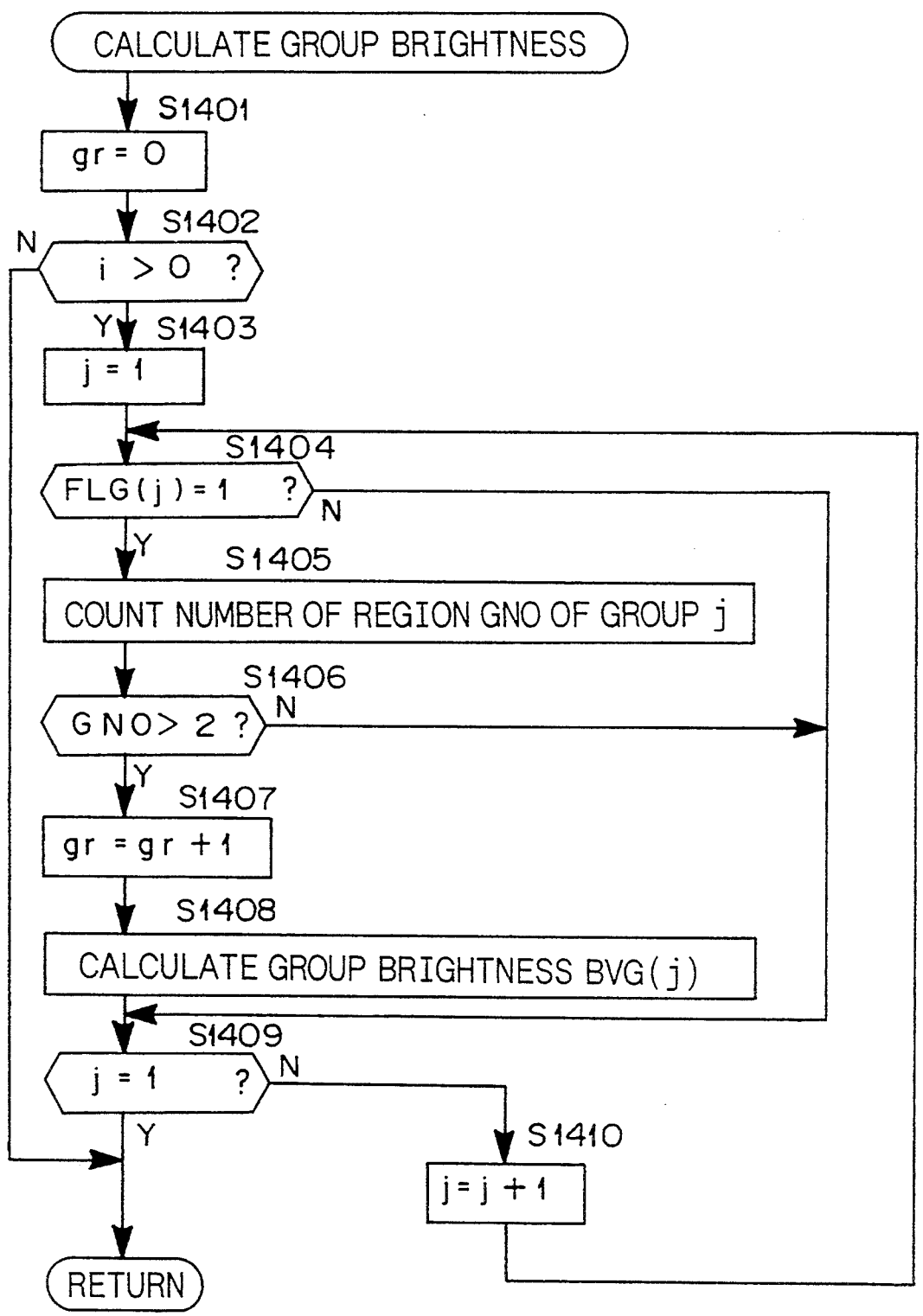
FIG. 23 is a flowchart for a processing subroutine of a group brightness value calculation of the fourth embodiment.

Next, the details of the processing for group brightness calculation at the step S812 will be described with reference to the flowchart of the subroutine shown in FIG. 23.

At a step S1401, "0" is substituted for a variable gr representing an effective group number to initialize the variable, and then at a step S1402 it is judged whether the count number i of the groups at the time when the grouping processing as described is terminated is larger than "0" or not. For i=0, it is judged that no group exists, and the processing is finished without further action and then the program goes to the step S813 of FIG. 17. For i≠0, it is judged that any group exists, and the program goes to a step S1403 to set "1" to a variable j.

At a step S1404, it is judged whether a group effective flag FLG(j)=1 or not. If the judgment is "YES", the program goes to a step S1405. If the judgment is "NO", the program goes to a step S1409.

At a step S1405, the number of photometric regions which belong to the group having the group number "j" is counted, and it is substituted for a variable GNO. As a counting method may be used a method that the number of photometric regions where GN(x,y)=j is satisfied for each photometric region at each address (x,y) is counted. Subsequently, the program goes to a step S1406 to judge whether the region number GNO as described above is larger than "2" or not. If the region number GNO is below "2", the number of photometric region in one group is small and thus the averaging operation provides small effect. In addition, a subject is small and it is not important as a subject. Therefore, the program goes to a step S1409 to invalidate the grouping.

On the other hand, if the region number GNO is larger than "2", the program goes to a step S1407 to increment the effective group number gr by "1", and further goes to a step S1408 to calculate average brightness value BVG(j) of the group of the group number j. The calculation of the average brightness value BVG(j) may be carried out by substituting the average value Vave of the photometric output values V(h,v) of the photometric regions belonging to the group of the group number j and the average value Kave of the correction values k(x,y) thereof for V(h,v) and k(h,v) of the equation (2) as described above. At this time, Vave and Kave may be calculated merely through the averaging as shown in the equations (21) and (22). However, by averaging v(h,v) and k(h,v) of regions whose correction values k(h,v) are small with being weighted, a more accurate brightness value can be obtained for those regions whose correction values are small because these regions have higher reliability for their photometric values.

$$Vave = \Sigma V(h,v)/Gnum \quad (21)$$

$$kave = \Sigma k(h,v)/Gnum \quad (22)$$

$$Vave' = \Sigma(V(h,v) \cdot (kmax-k(h,v)))/(Gnum \cdot kmax - \Sigma k(h,v)) \quad (23)$$

If the average photometric value is calculated using the equation (23), the correction value k is averaged with being weighted in accordance with the weighting of Vave, as show in equation (24)

$$kave' = \Sigma(k(h,v) \cdot (kmax-k(h,v)))/(Gnum \cdot kmax - \Sigma k(h,v)) \quad (24)$$

Here, Σ represents that all elements belonging to the group are summed up, and Gnum represents the number of regions which belong to the group. kmax represents the maximum value of the correction values k(x,y) of the regions belonging to the group. The average brightness value BVJ(j) is substituted for the brightness value of each photometric region belonging to the group of the group number j(BV(x,y)=BVJ(j)).

By newly calculating as the correction value k the optimum value over each of the grouped regions, the further more accurate brightness value can be obtained. When the memory capacity and calculation performance of the microcomputer are insufficient, it may be adopted that some patterns for the grouping are beforehand set and the optimum correction value k for each of the groups is stored respectively to refer to the most approximate group value of these groups.

After the average brightness value BVG(j) of the group of the group number j is calculated at the step S1408, the program goes to a next step S1409 to judge whether j=i or not. If the judgment at the step S1410 is negated, the program goes to a step S1410 to increment the variable j by "1", and then the program returns to the step S1404. If the judgment at the step S1410 is "YES", the calculation processing for the group brightness value based on the flowchart of FIG. 23 is finished, and then the program returns to the step S813 of FIG. 17.

(5) Exposure Calculation

Figure 25:
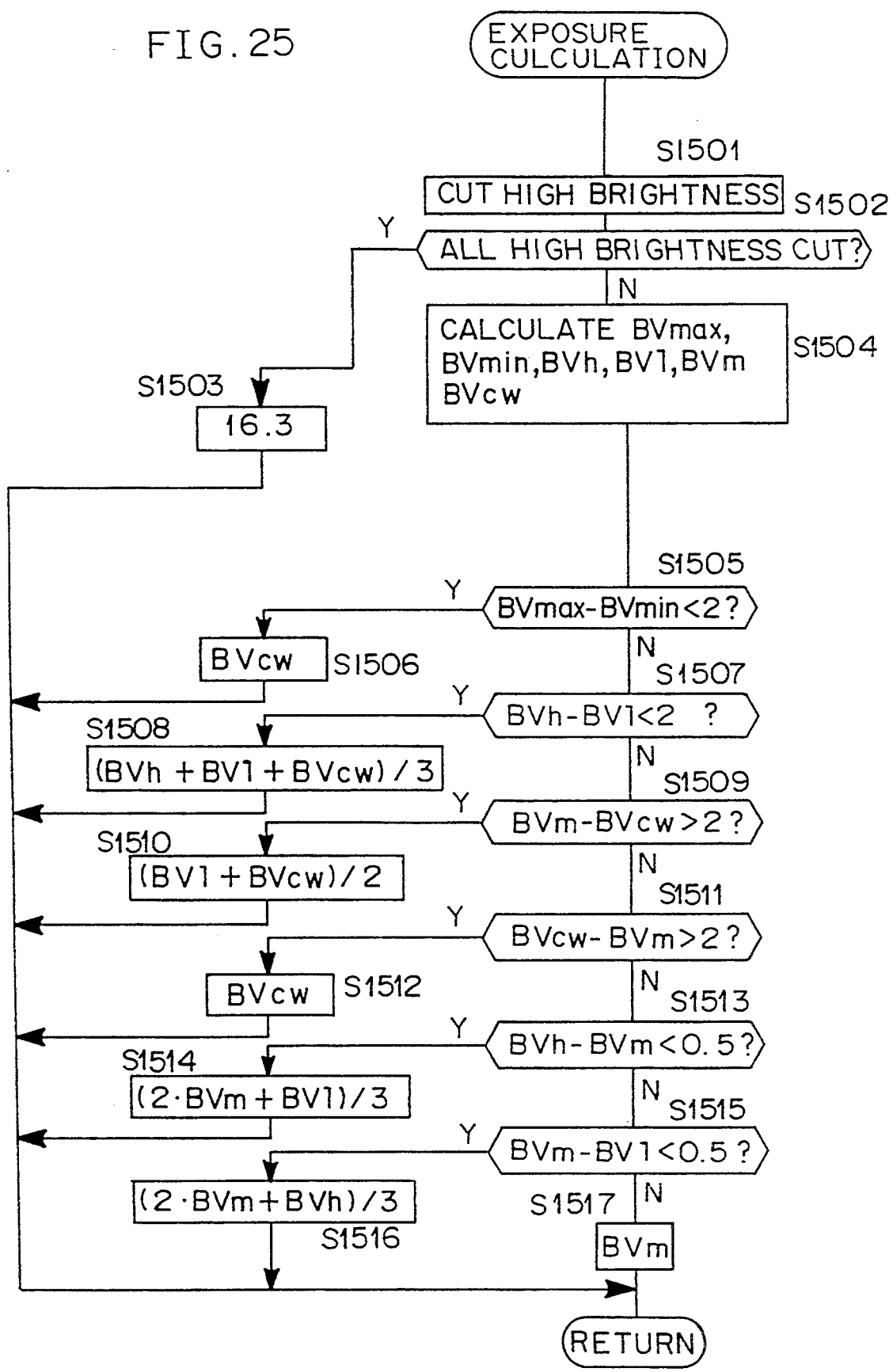
FIG. 25 is a flowchart for an exposure calculating subroutine of the fourth embodiment.

Next, the details of the exposure calculation at the step S813 will be described with reference to the flowchart of the subroutine shown in FIG. 25.

At a step S1501, of 240 brightness values obtained for each photometric region, those data whose brightness values exceed 16.3 EV are replaced by 16.3 EV. The reason is as follows. That is, when a high-brightness subject having a brightness value exceeding 16.3 EV such as the sun is contained in a photographic field, the high brightness value affects the calculation of the exposure value strongly, and thus the affection is required to be suppressed at maximum.

At a step S1502, it is judged whether all of 240 brightness values exceed 16.3 EV or not. If the judgment at the step S1502 is "YES", the program goes to a step S1503 to substitute 16.3 as the proper exposure value as shown in the equation (25).

$$BVans = 16.3 \quad (25)$$

If the judgment at the step S1502 is "NO", at least one of the 240 brightness values is smaller than 16.3 EV, and thus the program goes to a step S1504 to calculate BVmax, BVmin, BVh, BVl, BVm and BVcw from each brightness value BV(h,v). The contents of these variables are as follows.

BVmax: the maximum brightness value of 240 brightness values (not exceeding 16.3)

BVmin: the minimum brightness value of 240 brightness values

BVh: the average brightness value of 24 brightness values which are picked up according to degree from high to low in 240 brightness values BVl: the average brightness value of 24 brightness values which are picked up according th degree from low to high in 240 brightness values (when gr≠0, that is, a group is formed, it is the average value of the brightness values at the time when the number of regions, containing a region constituting the group, exceeds 24)

BVm: the average value of all of 240 brightness values

BVcw: the average brightness value of brightness values corresponding to 36 regions (as indicated by "A" in FIG. 3) of $8 \leq h \leq 13$ and $4 \leq v \leq 9$, of 240 brightness values BV(h,v).

In this embodiment, the average value of 24 brightness values used in averaging is calculated to obtain BVh and BVl, however, the number of the brightness values used in averaging is not limited to 24. For example, it may be more or less than 24. Likewise, the number of the brightness values for BVcw used in averaging is not limited 36, and it may be determined on the basis of brightness values which are located in the neighborhood of the center of the subject field. After a calculation at the step S1504 is finished at all, the program goes to a step S1505. The processing at step S1505 to S1517 is similar to those of the step S207 to S219 as shown in FIG. 5 in the first embodiment, and the description thereof is omitted.

(6) Calculation Method of Optimum Accumulation Time

Figure 26:
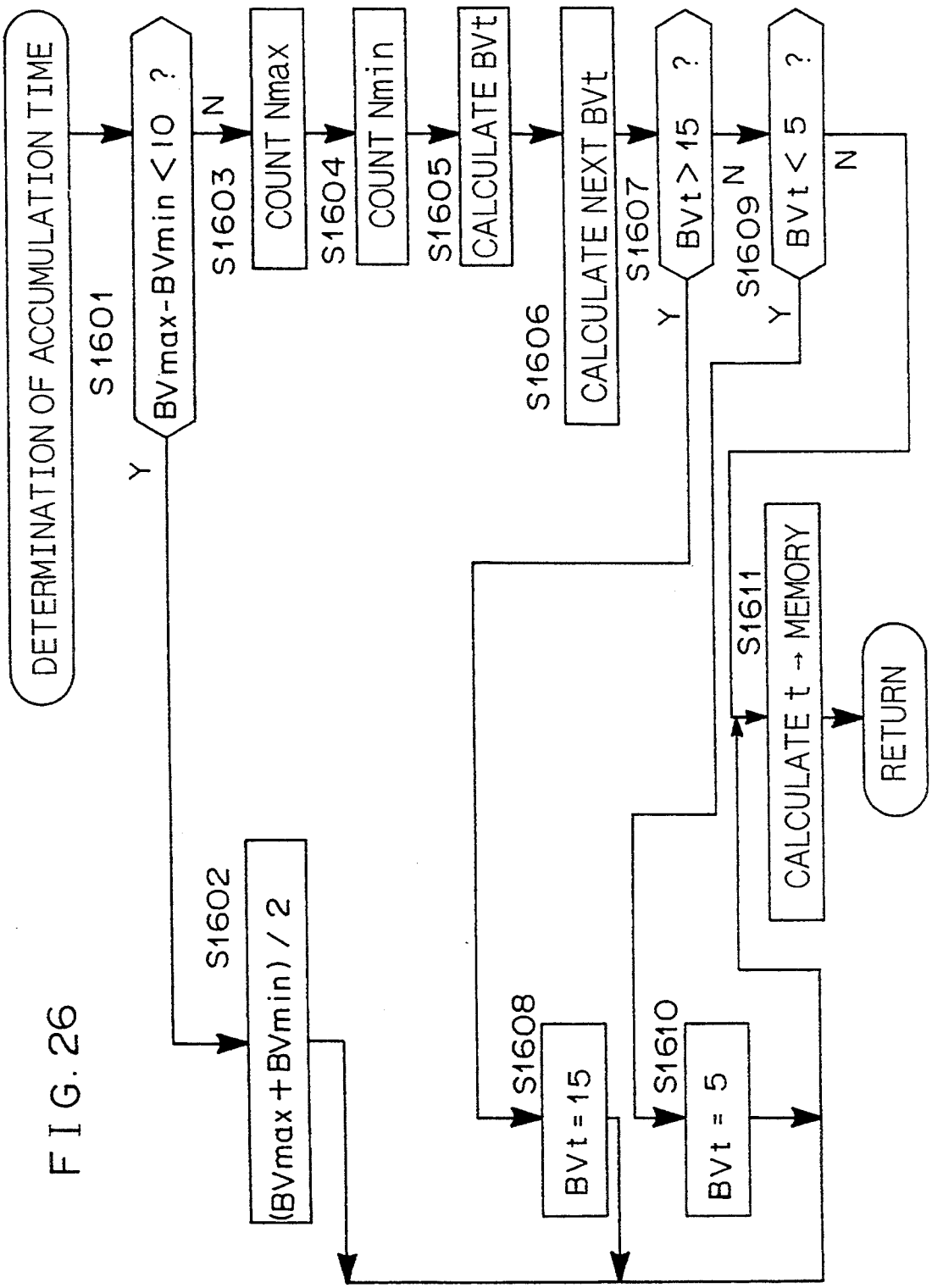
FIG. 26 is a flowchart for an accumulation time calculating subroutine of the fourth embodiment.

FIG. 26 is a subroutine flowchart showing the details of the accumulation-time calculation at the step S814 of FIG. 17. The processing at steps S1601 to S1611 as shown in FIG. 26 is similar to those of the steps S303 to S313 as shown in FIG. 6 in the first embodiment, and the description thereof is omitted.

As described above, according to the embodiments, those photometric regions which are impossible or very difficult to be subjected to the photometry due to their small photometric outputs are identified to group these regions, and the brightness values of all regions in a group are detected. Therefore, for a scene in which the whole subject field has not been conventionally photometrically measured in only one photometry because the difference between photometric outputs in the field is large, the photometric value for the whole scene can be obtained without carrying out the photometry again.

In the above embodiments, the calculation of the average value, the number of the grouping, the regions, etc. are determined on the basis of the brightness value from the brightness calculation unit. However, the photometric device of the camera according to this invention is not limited to this manner. For example, the following manner may be used for a camera, such as a camera having a lens shutter, for calculating the proper exposure value on the basis of the photometric outputs from the photometric device.

The following manner may be used. That is, the grouping unit 20 picks up and groups those regions providing small photometric outputs on the basis of the photometric output of each region obtained from the photometric device, and the group brightness calculating unit 21 detects the photometric output value on group basis on the basis of all regions in the group. The exposure calculation unit 18 calculates the proper exposure value on the basis of the output value on group basis and the photometric output value of each region.

The above embodiments corresponds to the case where the electric charge accumulation-type of photometric device is used. In place of the accumulation type, a device in which plural photometric information is output in time series may be used. Further, the division method of the photometric region is not limited to that of the embodiments as described above.

I claim:

1. A photometric device for a camera which is equipped with photometric means for carrying out a photometry for a subject field which is divided into plural photometric regions to detect information on brightness of each photometric region, thereby calculating an exposure value on the basis of the brightness information of the plural photometric regions output by said photometric means, comprising:
   judging means for judging on the basis of said brightness information, whether or not an object in said subject field has a low brightness;
   selection means for selecting a first calculation mode for calculating the exposure value on the basis of the brightness information of each photometric region when the judgment is made by said judging means that said object does not have a low brightness, and for selecting a second calculation mode for calculating an average value of plural brightness information of the plural photometric regions and calculating the exposure value on the basis of the average value thus calculated when the judgment is made by said judging means that said object has a low brightness; and
   exposure calculation means for calculating the exposure value in accordance with the selected calculation mode, said exposure calculation means calculating the exposure value on the basis of the brightness information of each photometric region when in said first calculation mode, and calculating the exposure value on the basis of the average value of the plural brightness information of the plural photometric regions when in said second calculation mode.

2. The photometric device as claimed in claim 1, wherein
   said photometric means includes a photoelectric conversion device and brightness value calculation means for calculating plural brightness values corresponding to the plural photometric regions on the basis of the output of said photoelectric conversion device, and
   in said first calculation mode said exposure value is calculated on the basis of said plural brightness values and in said second calculation mode said exposure value is calculated on the basis of an average value of said plural brightness values.

3. The photometric device as claimed in claim 1, wherein said photometric means includes a photoelectric conversion device, said photoelectric conversion device outputting photometric outputs for the plural photometric regions in time series.

4. The photometric device as claimed in claim 2, wherein when a maximum value of the brightness values is less than a predetermined value, the judgment is made by said judging means that said object has a low brightness, and when the maximum value is above the predetermined value, the judgment is made by said judging means that said object does not have a low brightness.

5. The photometric device as claimed in claim 4, wherein said photometric means includes an accumulation-type photoelectric conversion device and accumulation time setting means for setting an accumulation time of said photoelectric conversion element, said accumulation-time setting means setting an accumulation time for a next photometry so that the maximum brightness value is obtained for a photometric output corresponding to the predetermined value when the maximum value of the brightness values is lower than the predetermined value.

6. A photometric device for a camera which is equipped with photometric means for carrying out a photometry for a subject field which is divided into plural photometric regions to detect information on brightness of each photometric region, thereby calculating an exposure value on the basis of the brightness information of the plural photometric regions output by said photometric means, comprising:
   judging means for judging, on the basis of said brightness information, whether or not an object in said subject field has a low brightness;
   selection means for selecting a first calculation mode for calculating the exposure value on the basis of the brightness information of each photometric region when the judgment is made by said judging means that said object does not have a low brightness, and for selecting a second calculation mode for dividing the plural photometric regions into plural groups, calculating an average value of brightness information of the photometric regions in at least one of the plural groups and calculating the exposure value on the basis of the average value thus calculated when the judgment is made by said judging means that said object has a low brightness; and
   exposure calculation means for calculating the exposure value in accordance with the selected calculation mode, said exposure calculation means calculating the exposure value on the basis of the brightness information of each photometric region when in said first calculation mode, and calculating the exposure value on the basis of the average value of the plural brightness information of the plural photometric regions in the at least one of the plural groups when in said second calculation mode.

7. The photometric device as claimed in claim 6, wherein
said photometric means includes a photoelectric conversion device, and brightness value calculating means for calculating plural brightness values corresponding to the plural photometric regions on the basis of the output of said photoelectric conversion device, and
in said first calculation mode said exposure value is calculated on the basis of said plural brightness values and in said second calculation mode said exposure value is calculated on the basis of an average value of said plural brightness values.

8. The photometric device as claimed in claim 6, wherein said photometric means includes a photoelectric conversion device, said photoelectric conversion device outputting photometric outputs for the plural photometric regions in time series.

9. The photometric device as claimed in claim 7, wherein when a maximum value of the brightness values is less than a predetermined value, the judgment is made by said judging means that said object has a low brightness, and when the brightness value is above the predetermined value, the judgment is made by said judging means that said object does not have a low brightness.

10. The photometric device as claimed in claim 7, wherein said selection means includes a grouping means which groups said plural photometric regions into the plural groups so that a total number of the plural groups is increased as the maximum value of the brightness values is increased.

11. The photometric device as claimed in claim 9, wherein said selection means includes a grouping means which groups said plural photometric regions into the plural groups so that a total number of the plural groups is increased as the maximum value of the brightness values is increased.

12. The photometric device as claimed in claim 7, wherein said selection means includes a grouping means which groups said plural photometric regions into the plural groups so that at least two of the plural groups are overlapped with each other.

13. The photometric device as claimed in claim 12, wherein said grouping means groups said plural photometric regions into the plural groups so that the number of photometric regions contained in the overlapped portion is increased as the maximum value of the brightness values is increased.

14. The photometric device as claimed in claim 9, wherein said photometric means includes an accumulation-type of photoelectric conversion device, and accumulation time setting means for setting an accumulation time of said photoelectric conversion device, said accumulation time setting means setting an accumulation time for a next photometry so that the maximum brightness value is obtained for a photometric input corresponding to the predetermined value when the maximum value of the brightness values is lower than a predetermined value.

15. The photometric device as claimed in claim 11, wherein said photometric means includes an accumulation-type of photoelectric conversion device, and accumulation time setting means for setting an accumulation time of said photoelectric conversion device, said accumulation time setting means setting the accumulation time for the next photometry to be shorter as the number of photometric regions contained in a group is increased.

16. A photometric device for a camera which is equipped with photometric means for carrying out a photometry for a subject field which is divided into plural photometric regions to detect information on brightness of each photometric region, thereby calculating an exposure value on the basis of the brightness information of the plural photometric regions output by said photometric means, comprising:
first judging means for judging, on the basis of said brightness information, whether or not each of the plural photometric regions has a low brightness;
grouping means for grouping at least two photometric regions of the plural photometric regions into one groups, said at least two photometric regions being judged by said first judging means to have a low brightness;
group signal calculation means for calculating information representing a brightness of the group from the brightness information of photometric regions grouped by said grouping means; and
exposure calculation means for calculating the exposure value on the basis of the brightness information of each photometric region and the information representing a brightness of the group.

17. The photometric device as claimed in claim 16, wherein said information representing a brightness of the group is an average value of the brightness information of the grouped photometric regions.

18. The photometric device as claimed in claim 16, further comprising brightness value calculation means for calculating plural brightness values for the plural photometric regions on the basis of the plural brightness information,
and wherein said group signal calculation means calculates an average value of the plural brightness values of the photometric regions grouped by said grouping means to set the average value as the brightness value representing the group, and said exposure calculation means calculates the exposure value on the basis of the plural brightness values for each photometric region and the brightness value representing the group which is calculated by said group signal calculation means.

19. The photometric device as claimed in claim 16, wherein said grouping means conducts a grouping operation on photometric regions of the plural photometric regions, which are adjacent to one another and whose brightness information is lower than a predetermined value.

20. The photometric device as claimed in claim 18, wherein
said brightness value calculation means corrects the information on brightness with correction values for the plural photometric regions to calculate the brightness values for the plural photometric regions, and
said group signal calculation means corrects the information on brightness with the correction values for the photometric regions grouped by said grouping means to calculate the representative brightness value for the group.

21. The photometric device as claimed in claim 16, wherein said grouping means includes second judging means which judges whether the number of grouped photometric regions in the group does not reach a predetermined number, and, when the judgment is made by said second judging means that the number of grouped photometric regions in the group does not reach the predetermined number, the group signal calculation does not calculate information representing the brightness of the group.

22. The photometric device as claimed in claim 19, wherein said grouping means carries out the grouping operation by scanning the plural photometric regions with plural scanning lines, and in a case where photometric regions which are grouped into different groups on any scanning line belongs to a group in which both of the regions are adjacent to each other through a grouping operation on a different scanning line, said grouping means uniting any one of the groups with the other group.

23. A photometric device for a camera that performs photometry on a subject field that is divided into plural photometric regions to detect information on brightness of each photometric region, thereby calculating an exposure value on the basis of the brightness information of the plural photometric regions, said photometric device comprising:
- a judging device that judges, on the basis of said brightness information, whether or not an object in said subject field has a low brightness;
- a selection device that selects a first calculation mode in which the exposure value is calculated on the basis of the brightness information of each photometric region when the judgment is made by said judging device that said object does not have a low brightness, and that selects a second calculation mode in which an average value is calculated of plural brightness information of the plural photometric regions and the exposure value is calculated on the basis of the average value when the judgment is made by said judging device that said object has a low brightness; and
- an exposure calculation device that calculates the exposure value in accordance with the selected calculation mode, said exposure calculation device calculating the exposure value on the basis of the brightness information of each photometric region when in said first calculation mode, and calculating the exposure value on the basis of the average value of the plural brightness information of the plural photometric regions when in said second calculation mode.

24. A photometric device for a camera that performs photometry on a subject field that is divided into plural photometric regions to detect information on brightness of each photometric region, thereby calculating an exposure value on the basis of the brightness information of the plural photometric regions, said photometric device comprising:
- a judging device that judges, on the basis of said brightness information, whether or not an object in said subject field has a low brightness;
- a selection device that selects a first calculation mode in which the exposure value is calculated on the basis of the brightness information of each photometric region when the judgment is made by said judging device that said object does not have a low brightness, and that selects a second calculation mode in which the plural photometric regions are divided into plural groups, an average value is calculated of brightness information of the photometric regions in at least one of the plural groups, and the exposure value is calculated on the basis of the average value when the judgment is made by said judging device that said object has a low brightness; and
- an exposure calculation device that calculates the exposure value in accordance with the selected calculation mode, said exposure calculation device calculating the exposure value on the basis of the brightness information of each photometric region when in said first calculation mode, and calculating the exposure value on the basis of the average value of the plural brightness information of the plural photometric regions in the at least one of the plural groups when in said second calculation mode.

25. A photometric device for a camera that performs photometry for a subject field which is divided into plural photometric regions to detect information on brightness of each photometric region, thereby calculating an exposure value on the basis of the brightness information of the plural photometric regions, said photometric device comprising:
- a first judging device that judges, on the basis of said brightness information, whether or not each of the plural photometric regions has a low brightness;
- a grouping device that groups at least two photometric regions of the plural photometric regions into one group, said at least two photometric regions being judged by said first judging device to have a low brightness;
- a group signal calculation device that calculates information representing a brightness of the group from the brightness information of photometric regions grouped by said grouping device; and
- an exposure calculation device that calculates the exposure value on the basis of the brightness information of each photometric region and the information representing a brightness of the group.

* * * * *